(12) United States Patent
Imanaka et al.

(10) Patent No.: US 11,571,671 B2
(45) Date of Patent: Feb. 7, 2023

(54) ULTRAFINE BUBBLE GENERATING APPARATUS AND ULTRAFINE BUBBLE GENERATING METHOD

(71) Applicant: CANON KABUSHIKI KAISHA, Tokyo (JP)

(72) Inventors: Yoshiyuki Imanaka, Kawasaki (JP); Masahiko Kubota, Tokyo (JP); Akitoshi Yamada, Yokohama (JP); Yumi Yanai, Yokohama (JP); Hiroshi Arimizu, Yotsukaido (JP); Hiroyuki Ishinaga, Tokyo (JP); Teruo Ozaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 16/802,652

(22) Filed: Feb. 27, 2020

(65) Prior Publication Data

US 2020/0276550 A1    Sep. 3, 2020

(30) Foreign Application Priority Data

Feb. 28, 2019    (JP) ................................ 2019-035838

(51) Int. Cl.
*B01F 23/2373*    (2022.01)
*B01F 35/92*    (2022.01)
(Continued)

(52) U.S. Cl.
CPC ............ *B01F 35/92* (2022.01); *B01F 23/238* (2022.01); *B01F 23/2373* (2022.01);
(Continued)

(58) Field of Classification Search
CPC ................ B01F 23/2373; B01F 23/238; B01F 33/3033; B01F 35/93; B01F 2035/99; C02F 1/02; C02F 2303/26
(Continued)

(56) References Cited

U.S. PATENT DOCUMENTS

| 5,808,647 A | 9/1998 | Kurata et al. |
| 6,154,237 A | 11/2000 | Kashino et al. |

(Continued)

FOREIGN PATENT DOCUMENTS

| AU | 2850197 A | 1/1998 |
| CA | 2207236 A1 | 12/1997 |

(Continued)

OTHER PUBLICATIONS

First Office Action in Chinese Application No. 202010122855.7 (dated Nov. 2021).

(Continued)

*Primary Examiner* — Christopher Upton
(74) *Attorney, Agent, or Firm* — Venable LLP

(57) ABSTRACT

Provided is an ultrafine bubble generating apparatus that generates ultrafine bubbles by generating film boiling by causing a heater provided in a liquid to generate heat, the ultrafine bubble generating apparatus including: an element substrate including a first heater that generates the film boiling in the liquid and a second heater that is arranged adjacent to the first heater, in which the first heater and the second heater are driven in different timings.

9 Claims, 17 Drawing Sheets

(51) Int. Cl.
*C02F 1/00* (2006.01)
*C02F 1/02* (2006.01)
*B01F 33/3033* (2022.01)
*B01F 23/23* (2022.01)

(52) U.S. Cl.
CPC .......... *B01F 33/3033* (2022.01); *C02F 1/006* (2013.01); *C02F 1/02* (2013.01); *C02F 2303/26* (2013.01)

(58) Field of Classification Search
USPC .......................................... 261/128, 139, 142
See application file for complete search history.

(56) References Cited

U.S. PATENT DOCUMENTS

| | | | |
|---|---|---|---|
| 6,260,962 | B1 | 7/2001 | Yano et al. |
| 6,464,342 | B1 | 10/2002 | Kubota et al. |
| 7,448,730 | B2 | 11/2008 | Hirayama |
| 8,740,450 | B2 | 6/2014 | Mogami et al. |
| 2001/0019348 | A1 | 9/2001 | Yano et al. |
| 2007/0287917 | A1* | 12/2007 | Takahashi ................. C02F 1/34 204/157.15 |
| 2015/0336029 | A1* | 11/2015 | Kobayashi .......... B01F 23/2319 96/219 |
| 2017/0113946 | A1* | 4/2017 | Uno ...................... B01F 23/238 |

FOREIGN PATENT DOCUMENTS

| | | |
|---|---|---|
| JP | 5-31904 A | 2/1993 |
| JP | 5-185680 A | 7/1993 |
| JP | 2003-005104 A | 1/2003 |
| JP | 2005-161847 A | 6/2005 |
| JP | 4456176 B2 | 4/2010 |
| JP | 6118544 B2 | 4/2017 |
| WO | 2017/000253 A1 | 1/2017 |
| WO | 2019/044631 A1 | 3/2019 |
| WO | 2019/044913 A1 | 3/2019 |

OTHER PUBLICATIONS

Kubota et al., U.S. Appl. No. 16/642,432, filed Feb. 27, 2020.
Takahashi et al., U.S. Appl. No. 16/642,426, filed Feb. 27, 2020.
Kubota et al., U.S. Appl. No. 16/802,685, filed Feb. 27, 2020.
Ozaki et al., U.S. Appl. No. 16/802,672, filed Feb. 27, 2020.
Arimizu et al., U.S. Appl. No. 16/802,675, filed Feb. 27, 2020.
Imanaka et al., U.S. Appl. No. 16/802,688, filed Feb. 27, 2020.
Imanaka et al., U.S. Appl. No. 16/802,693, filed Feb. 27, 2020.
Ishinaga et al., U.S. Appl. No. 16/802,680, filed Feb. 27, 2020.
Yanai et al., U.S. Appl. No. 16/802,677, filed Feb. 27, 2020.
Ozaki et al., U.S. Appl. No. 16/802,667, filed Feb. 27, 2020.
Imanaka et al., U.S. Appl. No. 16/802,661, filed Feb. 27, 2020.
Notification of Reasons for Refusal in Japanese Application No. 2019-035838 (dated Dec. 2022).

* cited by examiner

HEATING ELEMENT DRIVING SW LOGIC WAVEFORM

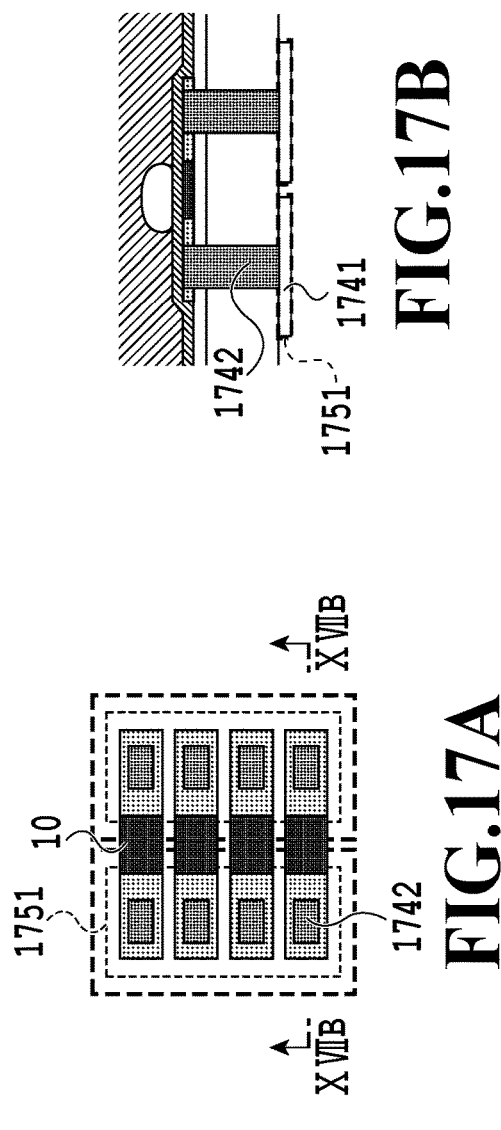
FIG.17A
FIG.17B
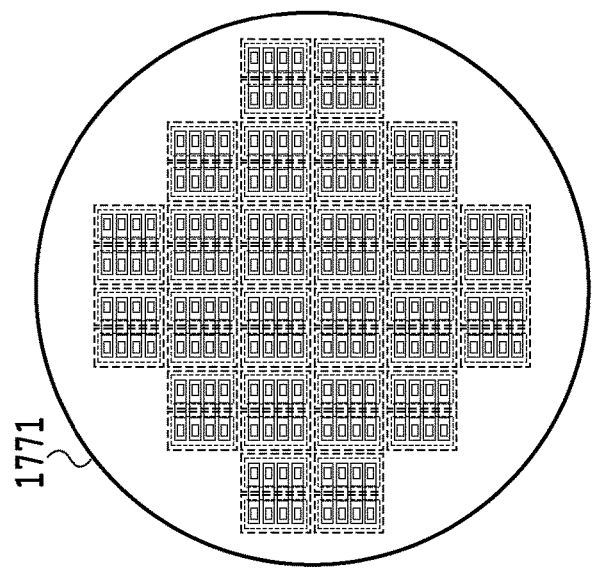
FIG.17D
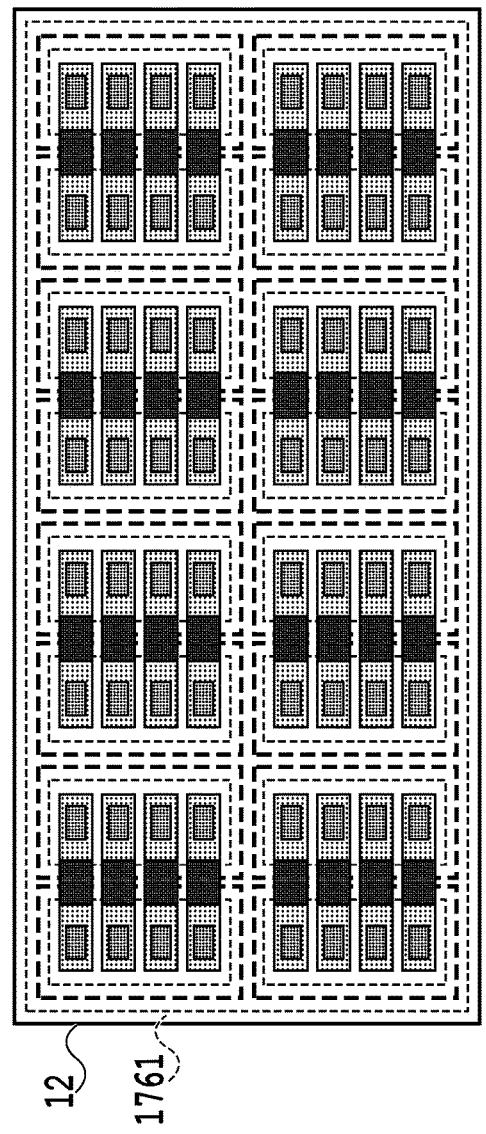
FIG.17C

ULTRAFINE BUBBLE GENERATING APPARATUS AND ULTRAFINE BUBBLE GENERATING METHOD

BACKGROUND OF THE INVENTION

Field of the Invention

The present invention relates to an ultrafine bubble generating apparatus and ultrafine bubble generating method for generating ultrafine bubbles smaller than 1.0 µm in diameter.

Description of the Related Art

Recently, there have been developed techniques for applying the features of fine bubbles such as microbubbles in micrometer-size in diameter and nanobubbles in nanometer-size in diameter. Especially, the utility of ultrafine bubbles (hereinafter also referred to as "UFBs") smaller than 1.0 µm in diameter have been confirmed in various fields.

Japanese Patent No. 6118544 discloses a fine air bubble generating apparatus that generates fine bubbles by ejecting from a depressurizing nozzle a pressurized liquid in which a gas is pressurized and dissolved. Japanese Patent No. 4456176 discloses an apparatus that generates fine bubbles by repeating separating and converging of flows of a gas-mixed liquid with a mixing unit.

SUMMARY OF THE INVENTION

An ultrafine bubble generating apparatus according to an aspect of the present invention is an ultrafine bubble generating apparatus that generates ultrafine bubbles by generating film boiling by causing a heater provided in a liquid to generate heat, the ultrafine bubble generating apparatus including an element substrate including a first heater that generates the film boiling in the liquid and a second heater that is arranged adjacent to the first heater, in which the first heater and the second heater are driven in different timings.

Further features of the present invention will become apparent from the following description of exemplary embodiments with reference to the attached drawings.

BRIEF DESCRIPTION OF THE DRAWINGS

FIGS. 17A to 17D are diagrams for describing a layout of the element substrate.

DESCRIPTION OF THE EMBODIMENTS

Both the apparatuses described in Japanese Patent Nos. 6118544 and 4456176 generate not only the UFBs of nanometer-size in diameter but also relatively a large number of milli-bubbles of millimeter-size in diameter and microbubbles of micrometer-size in diameter. However, because the milli-bubbles and the microbubbles are affected by the buoyancy, the bubbles are likely to gradually rise to the liquid surface and disappear during long-time storage.

On the other hand, the UFBs of nanometer-size in diameter are suitable for long-time storage since they are less likely to be affected by the buoyancy and float in the liquid with Brownian motion. However, when the UFBs are generated with the milli-bubbles and the microbubbles or the gas-liquid interface energy of the UFBs is small, the UFBs are affected by the disappearance of the milli-bubbles and the microbubbles and decreased over time. That is, in order to obtain a UFB-containing liquid in which the concentration reduction of the UFBs can be suppressed even during long-time storage, it is required to generate highly pure and highly concentrated UFBs with large gas-liquid interface energy when generating a UFB-containing liquid. Additionally, a UFB generating apparatus with improved durability is demanded.

<<Configuration of UFB Generating Apparatus>>

Figure 1:
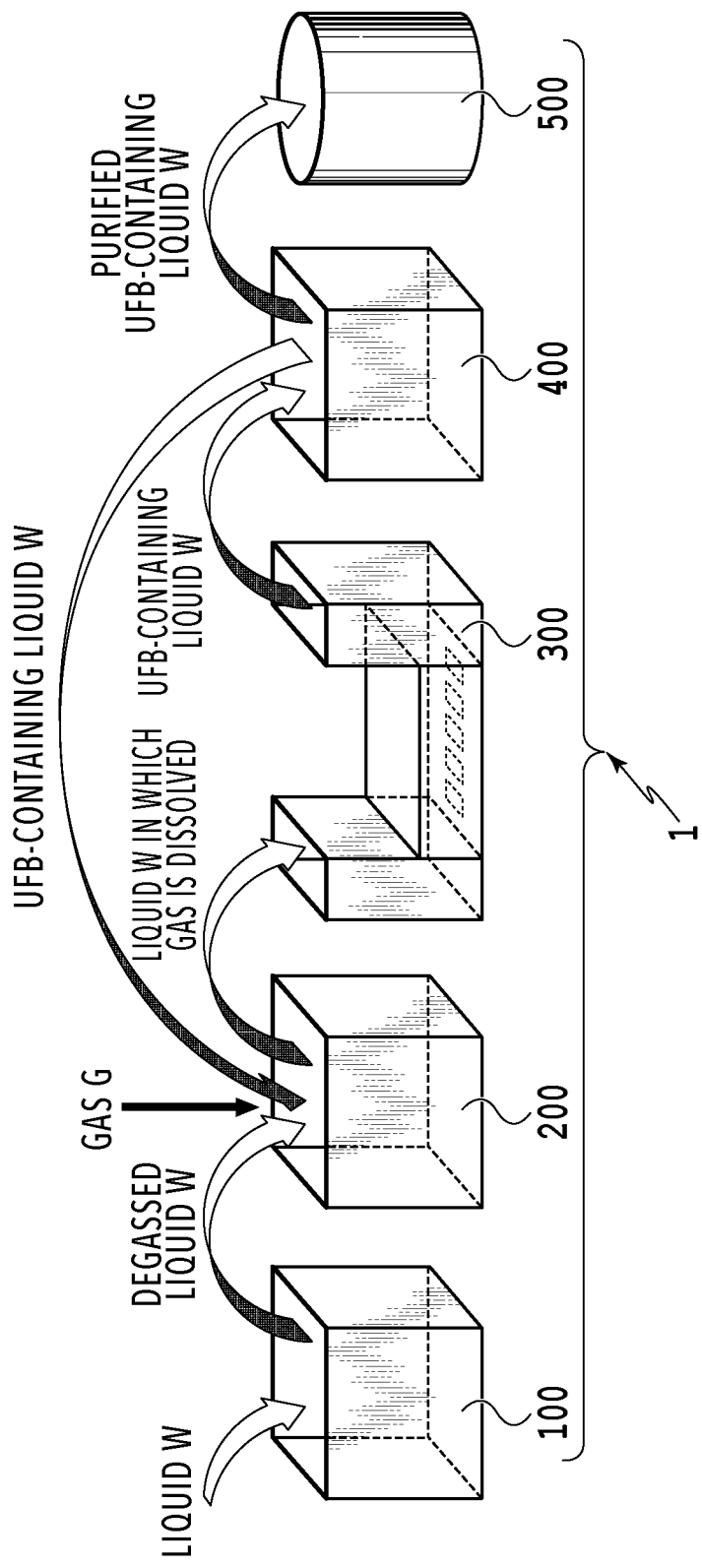
FIG. 1 is a diagram illustrating an example of a UFB generating apparatus.

FIG. 1 is a diagram illustrating an example of an ultrafine bubble generating apparatus (UFB generating apparatus) applicable to the present invention. A UFB generating apparatus 1 of this embodiment includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below. Although details are described later, UFBs generated by utilizing the film boiling caused by rapid heating are referred to as thermal-ultrafine bubbles (T-UFBs) in this specification.

Figure 2:
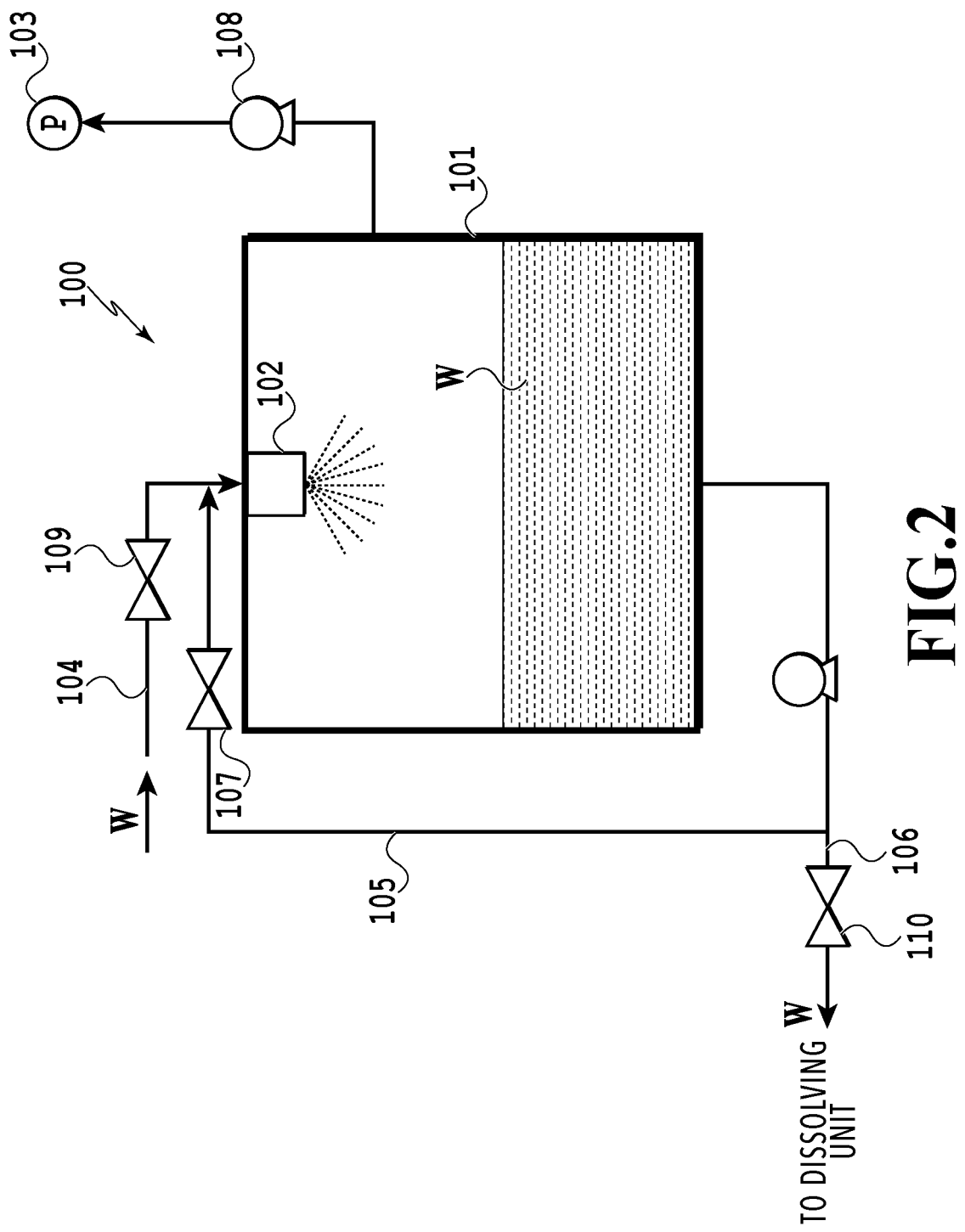
FIG. 2 is a schematic configuration diagram of a pre-processing unit.

FIG. 2 is a schematic configuration diagram of the pre-processing unit 100. The pre-processing unit 100 of this embodiment performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid W in the degassing container 101. The shower head 102 is for prompting the gasification of the liquid W; however, a centrifugal and the like may be used instead as the mechanism for producing the gasification prompt effect.

When a certain amount of the liquid W is reserved in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the pre-processing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W reserved in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the pre-processing 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly(4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

Figure 3A:
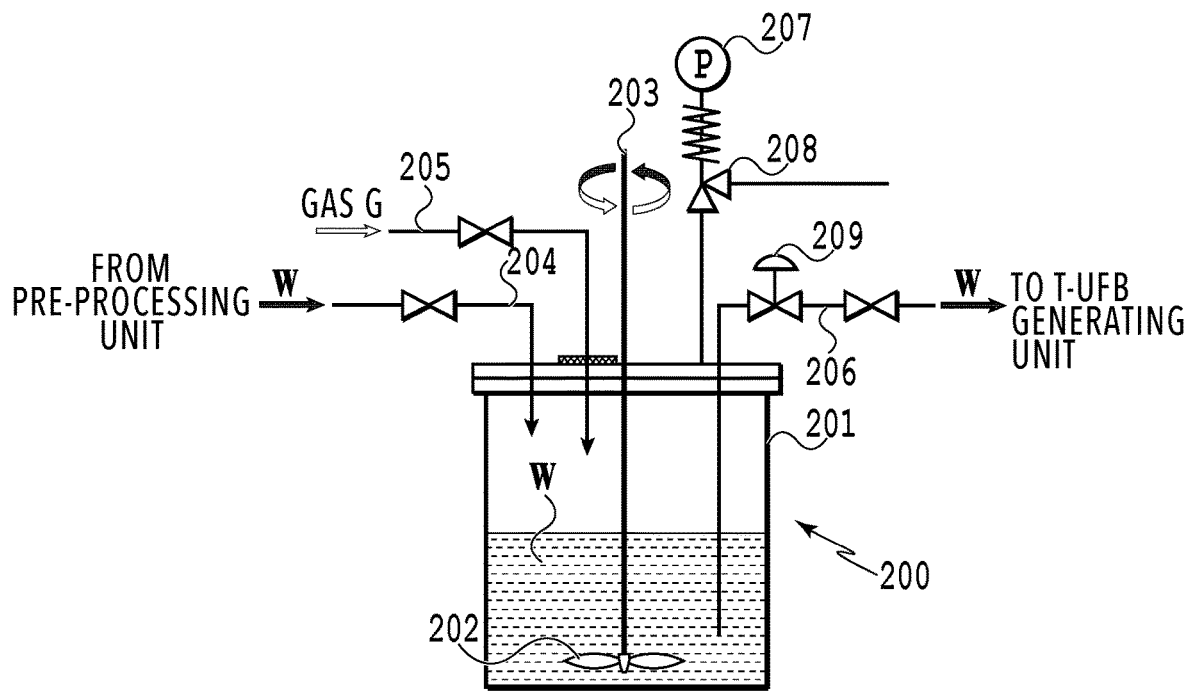
FIGS. 3A and 3B are a schematic configuration diagram of a dissolving unit and a diagram for describing the dissolving states in a liquid.
Figure 3B:
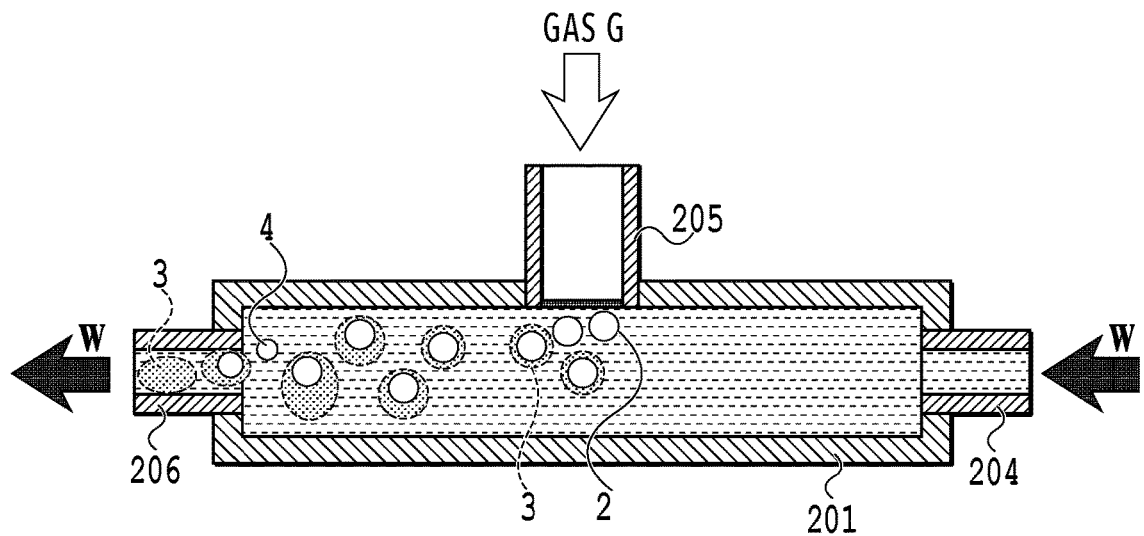

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 of this embodiment mainly includes a dissolving container 201, a rotation shaft 203 provided with a rotation plate 202, a liquid introduction passage 204, a gas introduction passage 205, a liquid discharge passage 206, and a pressurizing pump 207.

The liquid W supplied from the pre-processing unit 100 is supplied and reserved into the dissolving container 201 through the liquid introduction passage 204. Meanwhile, a gas G is supplied to the dissolving container 201 through the gas introduction passage 205.

Once predetermined amounts of the liquid W and the gas G are reserved in the dissolving container 201, the pressurizing pump 207 is activated to increase the internal pressure of the dissolving container 201 to about 0.5 MPa. A safety valve 208 is arranged between the pressurizing pump 207 and the dissolving container 201. With the rotation plate 202 in the liquid rotated via the rotation shaft 203, the gas G supplied to the dissolving container 201 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 201 to 0.5 MPa or higher. In this case, the material and the like of the container need to be the optimum for safety sake.

Once the liquid W in which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in the drawings means "a region of the liquid W in which the dissolution concentration of the gas G mixed therein is relatively high." In the gas components actually dissolved in the liquid W, the concentration of the gas components in the gas-dissolved liquid 3 is the highest at a portion surrounding the air bubble 2. In a case where the gas-dissolved liquid 3 is separated from the air bubble 2 the concentration of the gas components of the gas-dissolved liquid 3 is the highest at the center of the region, and the concentration is continuously decreased as away from the center. That is, although the region of the gas-dissolved liquid 3 is surrounded by a broken line in FIG. 3 for the sake of explanation, such a clear boundary does not actually exist. In addition, in the present discloser, a gas that cannot be dissolved completely may be accepted to exist in the form of an air bubble in the liquid.

Figure 4:
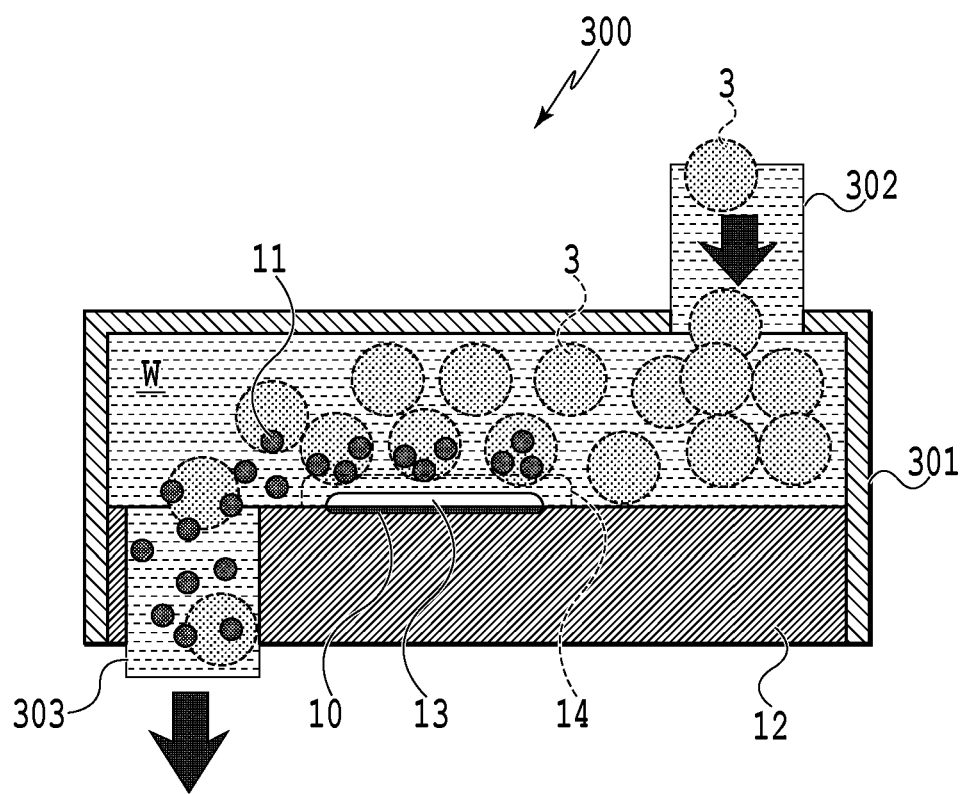
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. In the liquid W introduced from the liquid introduction passage 302, the gas-dissolved liquid 3 of the gas G put by the dissolving unit 200 is mixed.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
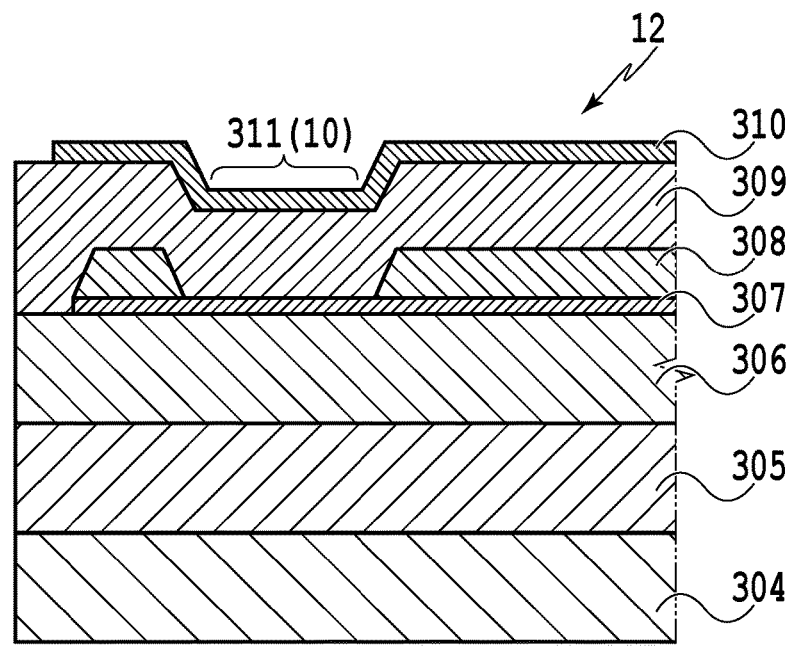
FIGS. 5A and 5B are diagrams for describing details of a heating element.
Figure 5B:
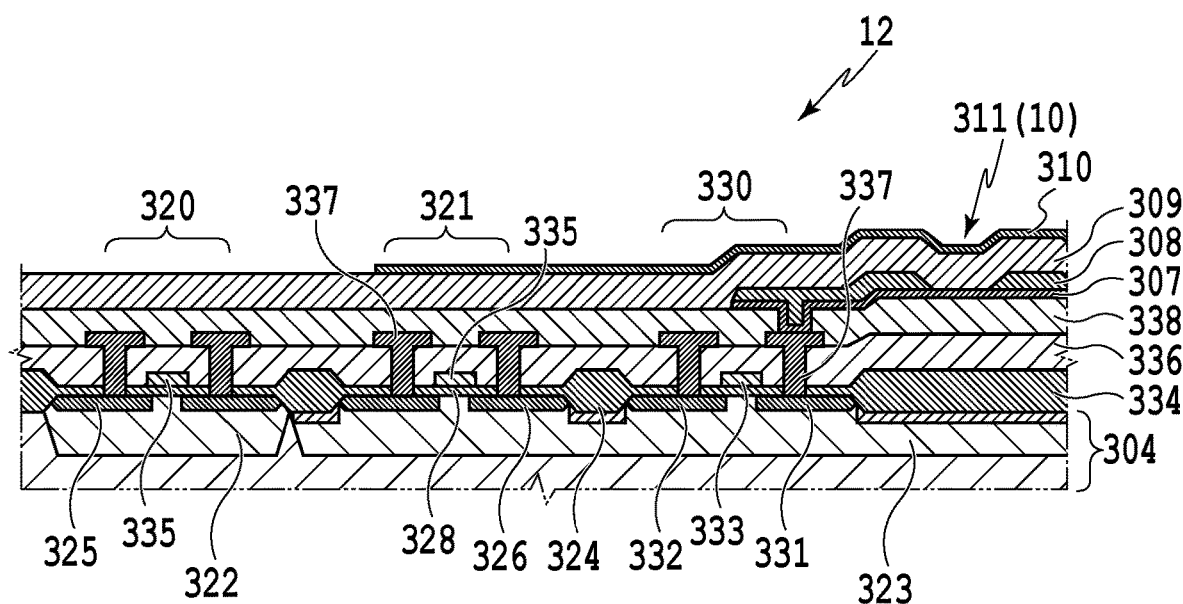

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12 of this embodiment, a thermal oxide film 305 as a heat-accumulating layer and an interlaminar film 306 also served as a heat-accumulating layer are laminated on a surface of a silicon substrate 304. An SiO$_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an SiO$_2$ film or an Si$_3$N$_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in the drawings is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. A P-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an SiO$_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as TaN, CrSiN, TaAl, WSiN, and the like can be applied as long as the material can generate the film boiling in the liquid.

Figure 6A:
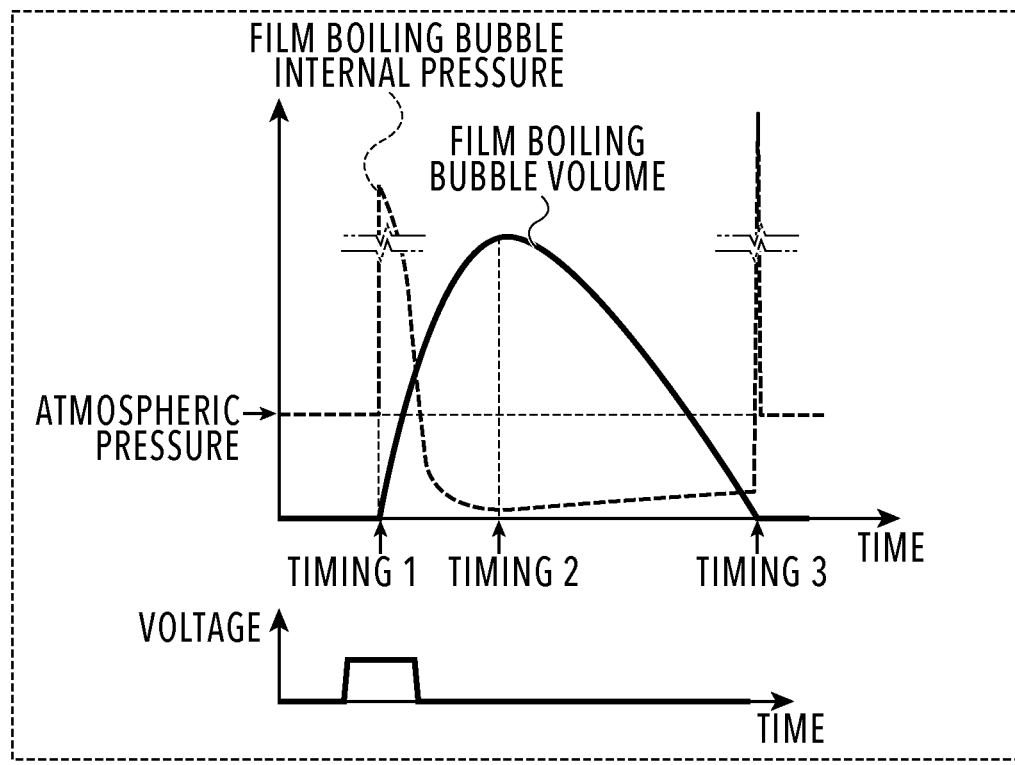
FIGS. 6A and 6B are diagrams for describing the states of film boiling on the heating element.
Figure 6B:
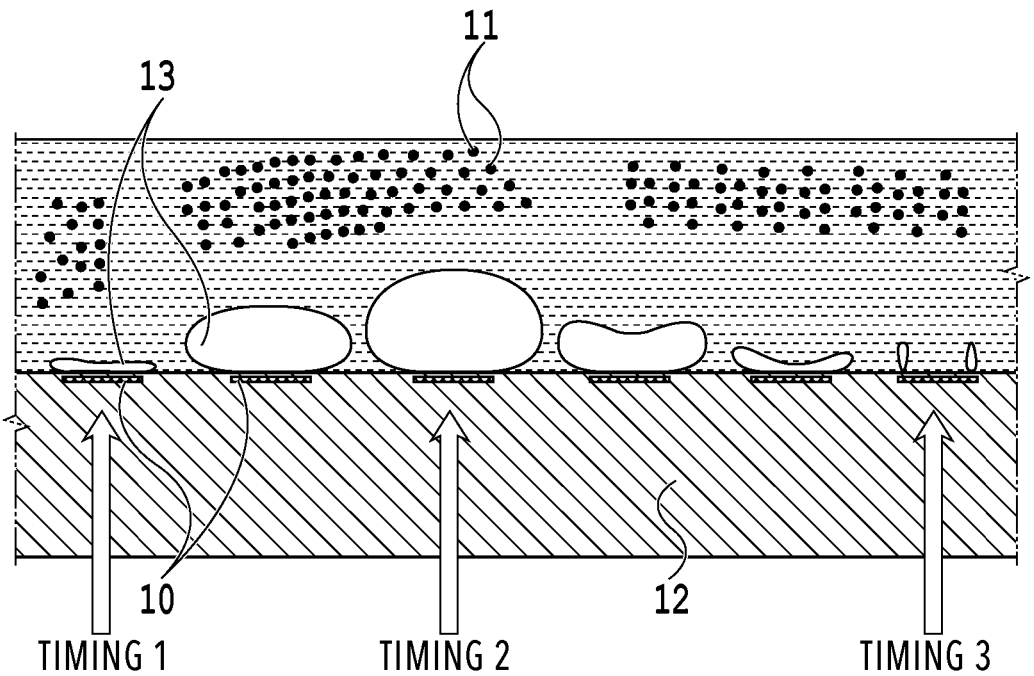

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order. The UFBs 11 generated by the film boiling as described later are mainly generated near a surface of the film boiling bubble 13. The states illustrated in FIG. 6B are the states where the UFBs 11 generated by the generating unit 300 are resupplied to the dissolving unit 200 through the circulation route, and the liquid containing the UFBs 11 is resupplied to the liquid passage of the generating unit 300, as illustrated in FIG. 1.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1). A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail with reference to FIGS. 7A to 10B.

Figure 7A:
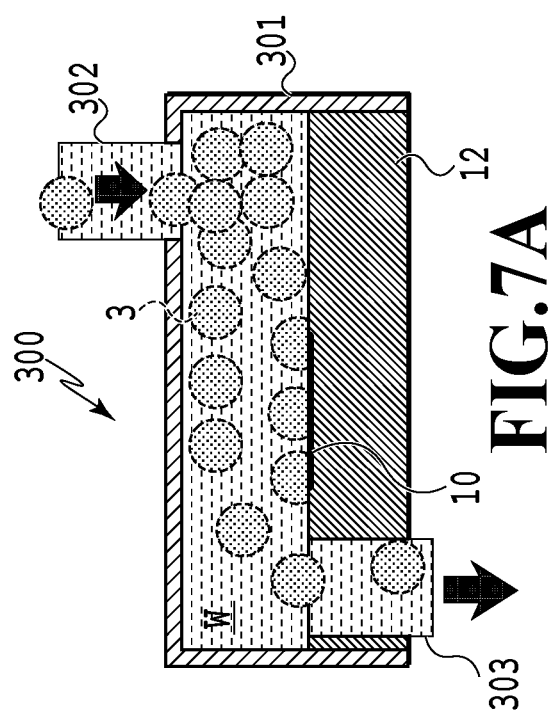
FIGS. 7A to 7D are diagrams illustrating the states of generation of UFBs caused by expansion of a film boiling bubble.

FIGS. 7A to 7D are diagrams schematically illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

Figure 7B:
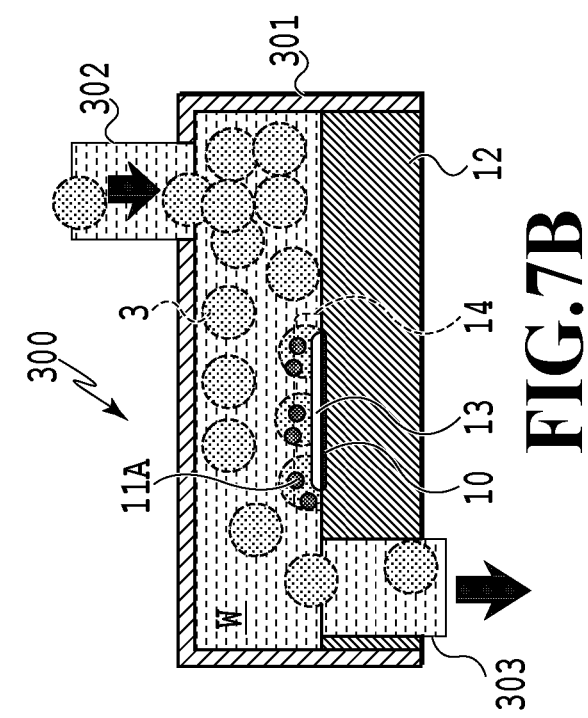

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIG. 7B, a region of the liquid that is around the film boiling bubble 13 and to be rapidly heated is indicated as a not-yet-bubbling high temperature region 14. The gas-dissolved liquid 3 within the not-yet-bubbling high temperature region 14 exceeds the thermal dissolution limit and is vaporized to become the UFB. The thus-vaporized air bubbles have diameters of around 10 nm to 100 nm and large gas-liquid interface energy. Thus, the air bubbles float independently in the liquid W without disappearing in a short time. In this embodiment, the air bubbles generated by the thermal action from the generation to the expansion of the film boiling bubble 13 are called first UFBs 11A.

Figure 7C:
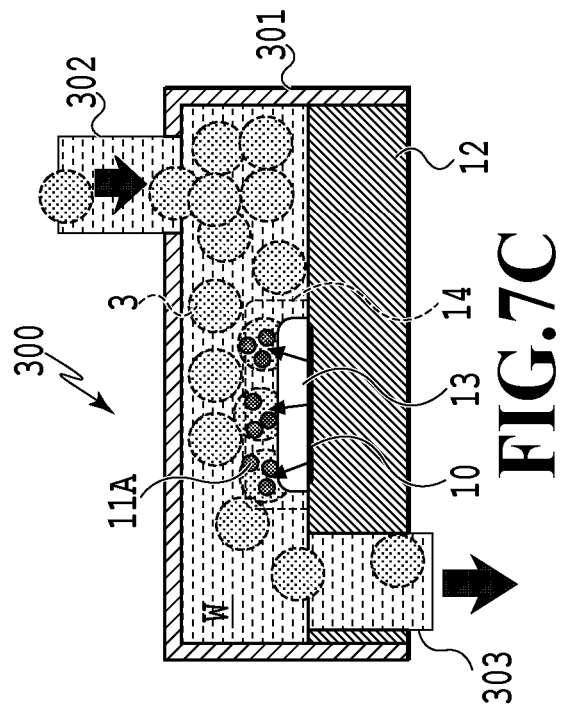

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia. Specifically, in the process of the expansion of the film boiling bubble 13, the gas-dissolved liquid 3 within the not-yet-bubbling high temperature region 14 is vaporized as a new air bubble and becomes the first UFB 11A.

Figure 7D:
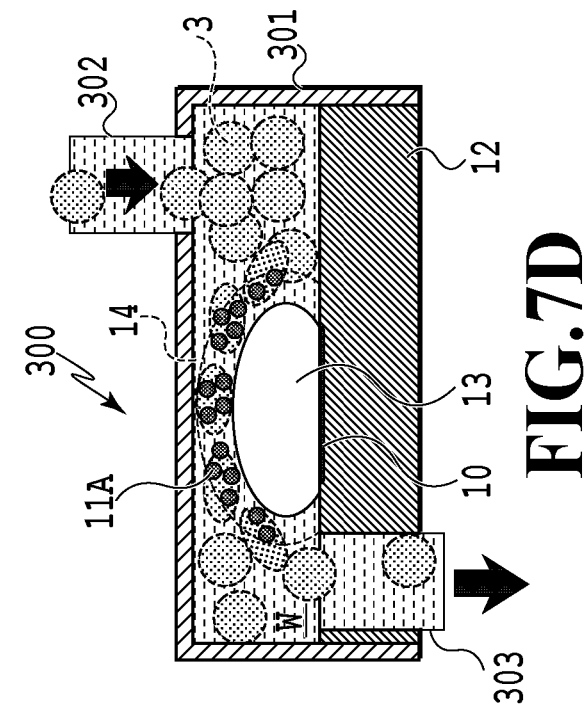

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
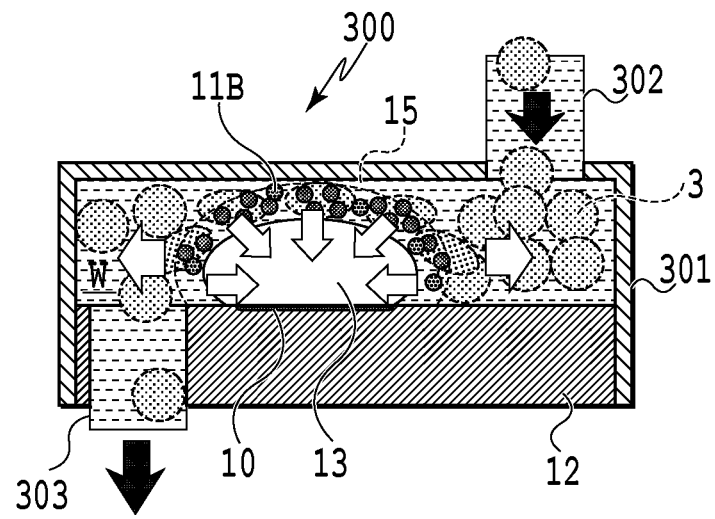
FIGS. 8A to 8C are diagrams illustrating the states of generation of UFBs caused by shrinkage of the film boiling bubble.
Figure 8B:
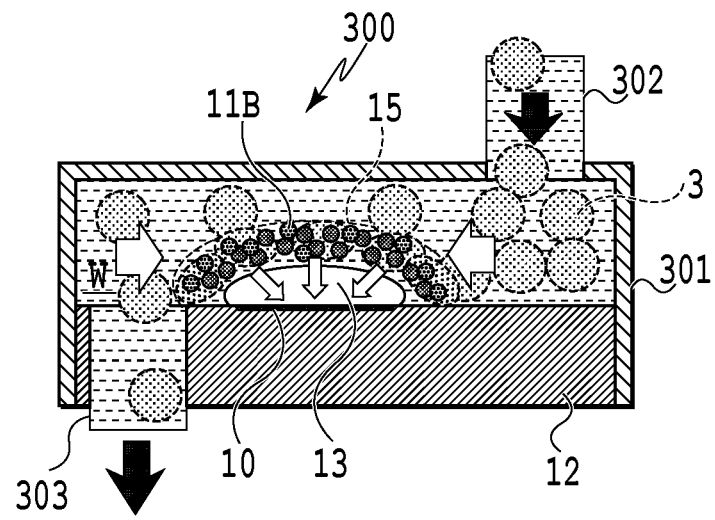
Figure 8C:
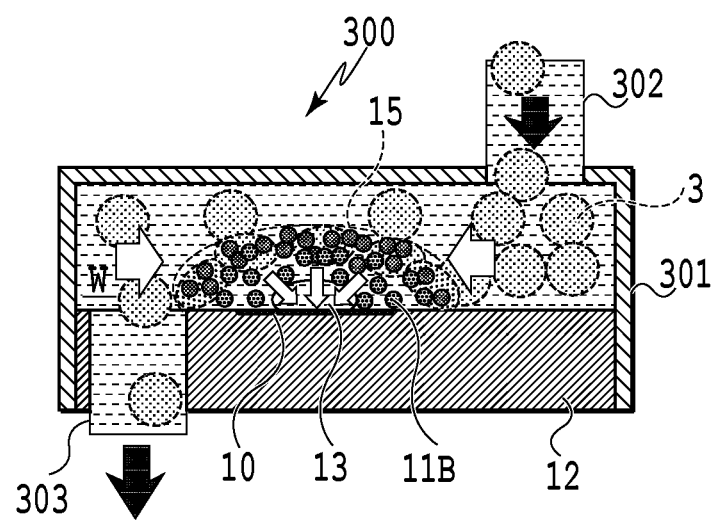
Figure 9A:
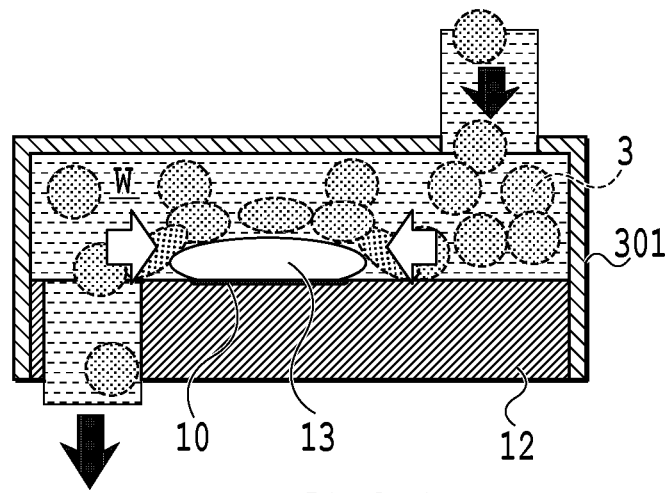
FIGS. 9A to 9C are diagrams illustrating the states of generation of UFBs caused by reheating of the liquid.
Figure 9B:
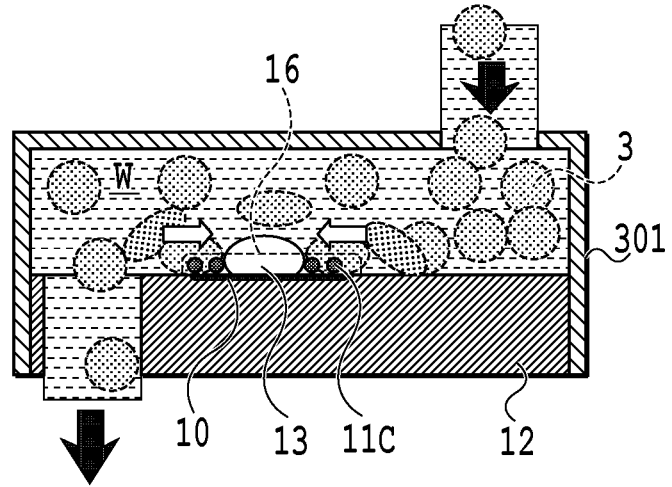
Figure 9C:
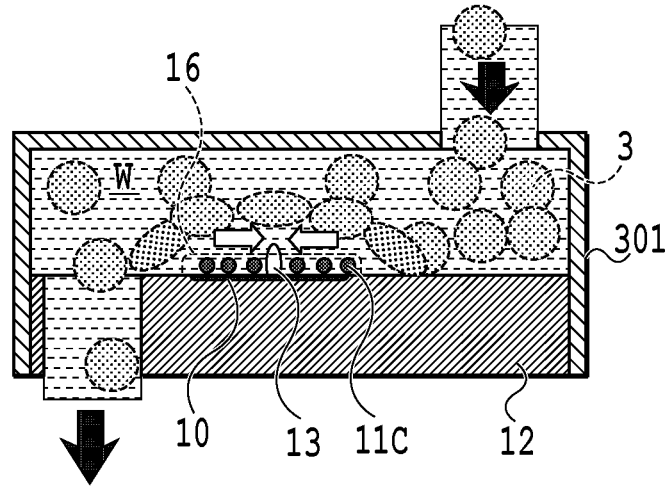

In the shrinking stage of the film boiling bubble 13, there are UFBs generated by the processes illustrated in FIGS. 8A to 8C (second UFBs 11B) and UFBs generated by the processes illustrated in FIGS. 9A to 9C (third UFBs 11C). It is considered that these two processes are made simultaneously.

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in the drawings as a not-yet-bubbling negative pressure region 15.

The gas-dissolved liquid 3 within the not-yet-bubbling negative pressure region 15 exceeds the pressure dissolution limit and is vaporized to become an air bubble. The thus-vaporized air bubbles have diameters of about 100 nm and thereafter float independently in the liquid W without disappearing in a short time. In this embodiment, the air bubbles vaporized by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in the drawings as a not-yet-bubbling reheated region 16. Although the film boiling is not made, the gas-dissolved liquid 3 within the not-yet-bubbling reheated region 16 exceeds the thermal dissolution limit and is vaporized. In this embodiment, the air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
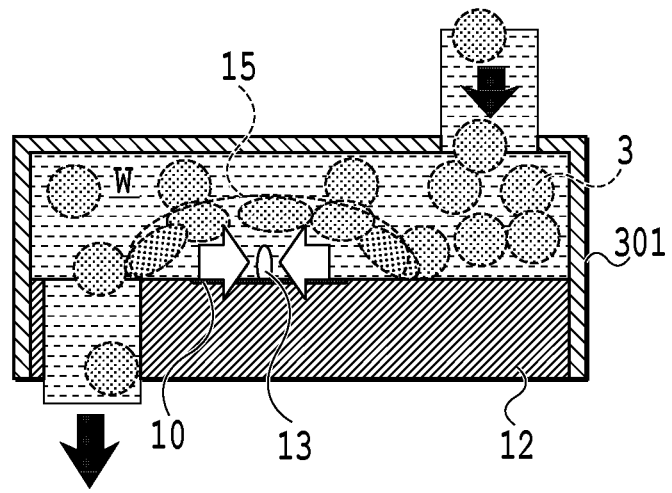
FIGS. 10A and 10B are diagrams illustrating the states of generation of UFBs caused by shock waves made by disappearance of the bubble generated by the film boiling.
Figure 10B:
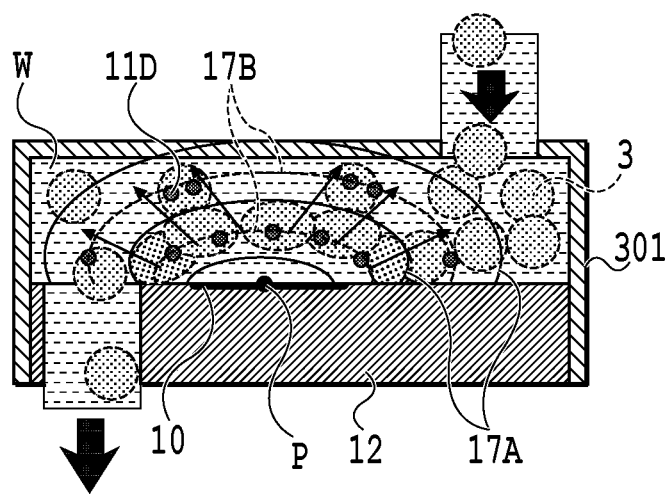

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. In this embodiment, compression waves of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are vaporized in the not-yet-bubbling negative pressure region 15 simultaneously with the disappearance of the film boiling bubble 13. In this embodiment, the air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 µS or less) in an extremely narrow thin film-shaped region. The diameter is sufficiently smaller than that of the first to third UFBs, and the gas-liquid interface energy is higher than that of the first to third UFBs. For this reason, it is considered that the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

As described above, it is expected that the UFBs 11 are generated in the multiple stages from the generation to the disappearance of the film boiling bubble 13 by the heat generation of the heating element 10. The first UFBs 11A, the second UFBs 11B, and the third UFBs 11C are generated near the surface of the film boiling bubble generated by the film boiling. In this case, near means a region within about 20 µm from the surface of the film boiling bubble. The fourth UFBs 11D are generated in a region through which the shock waves are propagated when the air bubble disappears. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and appeared in the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, such temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the first UFBs 11A described with FIGS. 7A to 7C and the third UFBs 11C described with FIGS. 9A to 9C can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased instantly, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, such pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A to 10C can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the film boiling phenomenon. In this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 μm or less, and milli-bubbles and microbubbles are unlikely to be generated. That is, the T-UFB generating method allows dominant and efficient generation of the UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, it is possible to prevent disappearance of the already generated T-UFBs due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 11A:
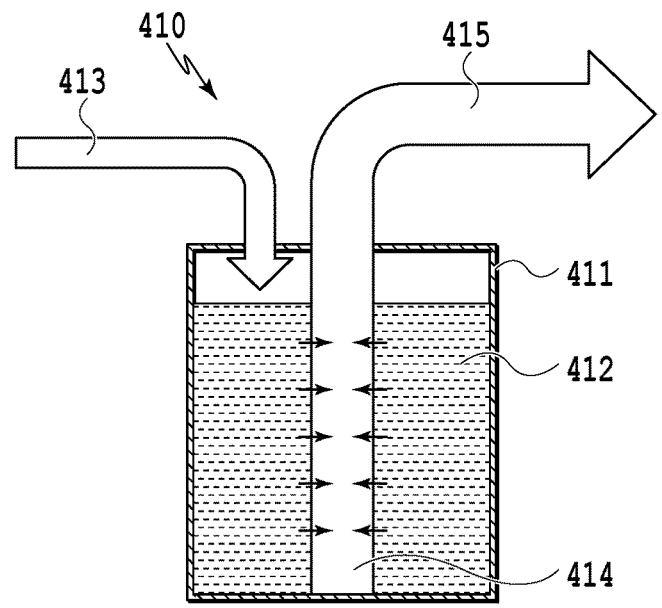
FIGS. 11A to 11C are diagrams illustrating configuration examples of a post-processing unit.
Figure 11B:
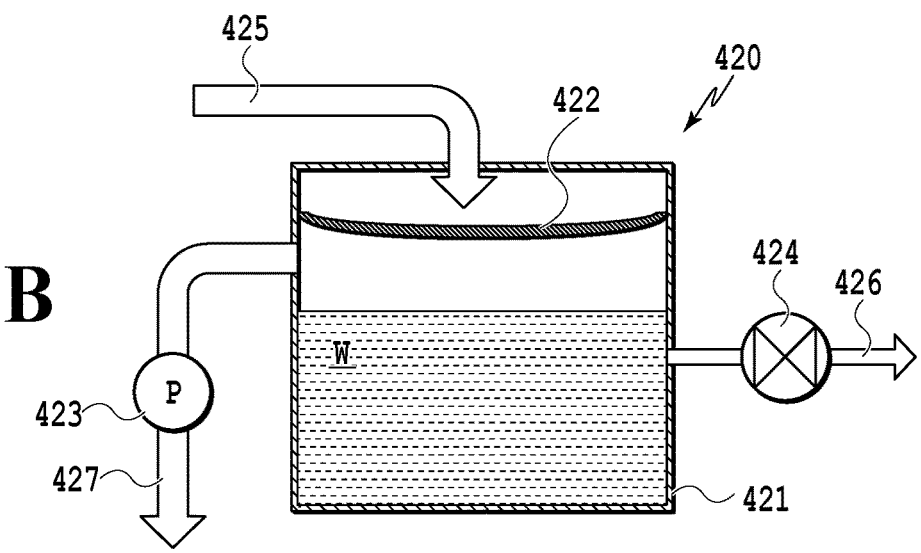
Figure 11C:
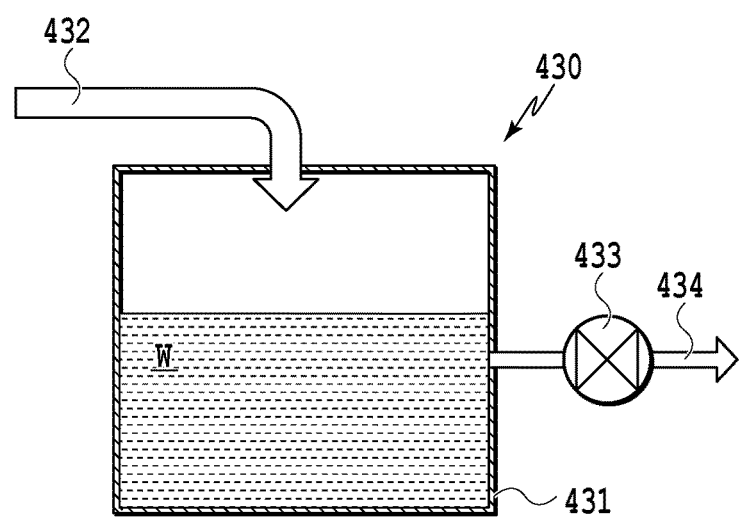

FIGS. 11A to 11C are diagrams illustrating configuration examples of the post-processing unit 400 of this embodiment. The post-processing unit 400 of this embodiment removes impurities in the UFB-containing liquid W in stages in the order from inorganic ions, organic substances, and insoluble solid substances.

FIG. 11A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage 415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials peeled off from the element substrate 12 of the T-UFB generating unit 300, such as $SiO_2$, SiN, SiC, Ta, $Al_2O_3$, $Ta_2O_5$, and Ir.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415. In this process in the present embodiment, not all the inorganic ions contained in the UFB-containing liquid W supplied from the liquid introduction passage 413 need to be removed as long as at least a part of the inorganic ions are removed.

FIG. 11B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is reserved into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-µm-mesh (a filter of 1 µm or smaller in mesh diameter) that can remove bacteria, and a filter of a nm-mesh that can remove virus. The filtration filter having such a fine opening diameter may remove air bubbles larger than the opening diameter of the filter. Particularly, there may be the case where the filter is clogged by the fine air bubbles adsorbed to the openings (mesh) of the filter, which may slowdown the filtering speed. However, as described above, most of the air bubbles generated by the T-UFB generating method described in the present embodiment of the invention are in the size of 1 µm or smaller in diameter, and milli-bubbles and microbubbles are not likely to be generated. That is, since the probability of generating milli-bubbles and microbubbles is extremely low, it is possible to suppress the slowdown in the filtering speed due to the adsorption of the air bubbles to the filter. For this reason, it is favorable to apply the filtration filter 422 provided with the filter of 1 µm or smaller in mesh diameter to the system having the T-UFB generating method.

Examples of the filtration applicable to this embodiment may be a so-called dead-end filtration and cross-flow filtration. In the dead-end filtration, the direction of the flow of the supplied liquid and the direction of the flow of the filtration liquid passing through the filter openings are the same, and specifically, the directions of the flows are made along with each other. In contrast, in the cross-flow filtration, the supplied liquid flows in a direction along a filter surface, and specifically, the direction of the flow of the supplied liquid and the direction of the flow of the filtration liquid passing through the filter openings are crossed with each other. It is preferable to apply the cross-flow filtration to suppress the adsorption of the air bubbles to the filter openings.

After a certain amount of the UFB-containing liquid W is reserved in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 11C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is reserved into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434. The example of applying the three post-processing mechanisms in sequence is shown in this embodiment; however, it is not limited thereto, and the order of the three post-processing mechanisms may be changed, or at least one needed post-processing mechanism may be employed.

Reference to FIG. 1 is made again. The T-UFB-containing liquid W from which the impurities are removed by the post-processing unit 400 may be directly transferred to the collecting unit 500 or may be put back to the dissolving unit 200 again. In the latter case, the gas dissolution concentration of the T-UFB-containing liquid W that is decreased due to the generation of the T-UFBs can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained. This embodiment shows a form in which the UFB-containing liquid processed by the post-processing unit 400 is put back to the dissolving unit 200 and circulated; however, it is not limited thereto, and the UFB-containing liquid after passing through the T-UFB generating unit may be put back again to the dissolving unit 200 before being supplied to the post-processing unit 400 such that the post-processing is performed by the post-processing unit 400 after the T-UFB concentration is increased through multiple times of circulation, for example.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit as the pre-processing unit 100 and the dissolving unit 200 can be omitted. On the other hand, when multiple kinds of gases are desired to be contained by the UFBs, another dissolving unit 200 may be added.

The units for removing the impurities as described in FIGS. 11A to 11C may be provided upstream of the T-UFB generating unit 300 or may be provided both upstream and downstream thereof. When the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there is a risk of deteriorating the heating element 10 and inducing the salting-out phenomenon. With the mechanisms as illustrated in FIGS. 11A to 11C provided upstream of the T-UFB generating unit 300, it is possible to remove the above-described impurities previously.

<<Liquid and Gas Usable for T-UFB-Containing Liquid>>

Now, the liquid W usable for generating the T-UFB-containing liquid is described. The liquid W usable in this embodiment is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may fuse a liquid or a solid containing desired components into the liquid W. The dissolution in this case may be spontaneous dissolution, dissolution caused by pressure application, or dissolution caused by hydration, ionization, and chemical reaction due to electrolytic dissociation.

<<Effects of T-UFB Generating Method>>

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. A liquid flows at a predetermined pressure to pass through the depressurizing structure, and air bubbles of various sizes are generated in a downstream region of the depressurizing structure.

In this case, among the generated air bubbles, since the relatively large bubbles such as milli-bubbles and microbubbles are affected by the buoyancy, such bubbles rise to the liquid surface and disappear. Even the UFBs that are not affected by the buoyancy may also disappear with the milli-bubbles and microbubbles since the gas-liquid interface energy of the UFBs is not very large. Additionally, even if the above-described depressurizing structures are arranged in series, and the same liquid flows through the depressurizing structures repeatedly, it is impossible to store for a long time the UFBs of the number corresponding to the number of repetitions. In other words, it has been difficult for the UFB-containing liquid generated by the conventional UFB generating method to maintain the concentration of the contained UFBs at a predetermined value for a long time.

In contrast, in the T-UFB generating method of this embodiment utilizing the film boiling, a rapid temperature change from normal temperature to about 300° C. and a rapid pressure change from normal pressure to around a several megapascal occur locally in a part extremely close to the heating element. The heating element is a rectangular shape having one side of around several tens to hundreds of μm. It is around $1/10$ to $1/1000$ of the size of a conventional UFB generating unit. Additionally, with the gas-dissolved liquid within the extremely thin film region of the film boiling bubble surface exceeding the thermal dissolution limit or the pressure dissolution limit instantaneously (in an extremely short time under microseconds), the phase transition occurs and the gas-dissolved liquid is precipitated as the UFBs. In this case, the relatively large bubbles such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long time.

Particularly, the present discloser using the film boiling phenomenon that enables local formation of a gas interface in the liquid can form an interface in a part of the liquid close to the heating element without affecting the entire liquid region, and a region on which the thermal and pressure actions performed can be extremely local. As a result, it is possible to stably generate desired UFBs. With further more conditions for generating the UFBs applied to the generation liquid through the liquid circulation, it is possible to additionally generate new UFBs with small effects on the already-made UFBs. As a result, it is possible to produce a UFB liquid of a desired size and concentration relatively easily.

Moreover, since the T-UFB generating method has the above-described hysteresis properties, it is possible to increase the concentration to a desired concentration while keeping the high purity. In other words, according to the T-UFB generating method, it is possible to efficiently generate a long-time storable UFB-containing liquid with high purity and high concentration.

<<Specific Usage of T-UFB-Containing Liquid>>

In general, applications of the ultrafine bubble-containing liquids are distinguished by the type of the containing gas. Any type of gas can make the UFBs as long as an amount of around PPM to BPM of the gas can be dissolved in the liquid. For example, the ultrafine bubble-containing liquids can be applied to the following applications.

A UFB-containing liquid containing air can be preferably applied to cleansing in the industrial, agricultural and fishery, and medical scenes and the like, and to cultivation of plants and agricultural and fishery products.

A UFB-containing liquid containing ozone can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing nitrogen can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing oxygen can be preferably applied to cleansing application in the industrial, agricultural and fishery, and medical scenes and the like, and to cultivation of plants and agricultural and fishery products.

A UFB-containing liquid containing carbon dioxide can be preferably applied to not only cleansing application in the industrial, agricultural and fishery, and medical scenes and the like, but to also applications intended to disinfection, sterilization, and decontamination, for example.

A UFB-containing liquid containing perfluorocarbons as a medical gas can be preferably applied to ultrasonic diagnosis and treatment. As described above, the UFB-containing liquids can exert the effects in various fields of medical, chemical, dental, food, industrial, agricultural and fishery, and so on.

In each of the applications, the purity and the concentration of the UFBs contained in the UFB-containing liquid are important for quickly and reliably exert the effect of the UFB-containing liquid. In other words, unprecedented effects can be expected in various fields by utilizing the T-UFB generating method of this embodiment that enables generation of the UFB-containing liquid with high purity and desired concentration. Here is below a list of the applications in which the T-UFB generating method and the T-UFB-containing liquid are expected to be preferably applicable.

(A) Liquid Purification Application

With the T-UFB generating unit provided to a water clarification unit, enhancement of an effect of water clarification and an effect of purification of PH adjustment liquid is expected. The T-UFB generating unit may also be provided to a carbonated water server.

With the T-UFB generating unit provided to a humidifier, aroma diffuser, coffee maker, and the like, enhancement of a humidifying effect, a deodorant effect, and a scent spreading effect in a room is expected.

If the UFB-containing liquid in which an ozone gas is dissolved by the dissolving unit is generated and is used for dental treatment, burn treatment, and wound treatment using an endoscope, enhancement of a medical cleansing effect and an antiseptic effect is expected.

With the T-UFB generating unit provided to a water storage tank of a condominium, enhancement of a water clarification effect and chlorine removing effect of drinking water to be stored for a long time is expected.

If the T-UFB-containing liquid containing ozone or carbon dioxide is used for brewing process of Japanese sake, shochu, wine, and so on in which the high-temperature pasteurization processing cannot be performed, more efficient pasteurization processing than that with the conventional liquid is expected.

If the UFB-containing liquid is mixed into the ingredient in a production process of the foods for specified health use and the foods with functional claims, the pasteurization processing is possible, and thus it is possible to provide safe and functional foods without a loss of flavor.

With the T-UFB generating unit provided to a supplying route of sea water and fresh water for cultivation in a cultivation place of fishery products such as fish and pearl, prompting of spawning and growing of the fishery products is expected.

With the T-UFB generating unit provided in a purification process of water for food preservation, enhancement of the preservation state of the food is expected.

With the T-UFB generating unit provided in a bleaching unit for bleaching pool water or underground water, a higher bleaching effect is expected.

With the T-UFB-containing liquid used for repairing a crack of a concrete member, enhancement of the effect of crack repairment is expected.

With the T-UFBs contained in liquid fuel for a machine using liquid fuel (such as automobile, vessel, and airplane), enhancement of energy efficiency of the fuel is expected.

(B) Cleansing Application

Recently, the UFB-containing liquids have been receiving attention as cleansing water for removing soils and the like attached to clothing. If the T-UFB generating unit described in the above embodiment is provided to a washing machine, and the UFB-containing liquid with higher purity and better permeability than the conventional liquid is supplied to the washing tub, further enhancement of detergency is expected.

With the T-UFB generating unit provided to a bath shower and a bedpan washer, not only a cleansing effect on all kinds of animals including human body but also an effect of prompting contamination removal of a water stain and a mold on a bathroom and a bedpan are expected.

With the T-UFB generating unit provided to a window washer for automobiles, a high-pressure washer for cleansing wall members and the like, a car washer, a dishwasher, a food washer, and the like, further enhancement of the cleansing effects thereof is expected.

With the T-UFB-containing liquid used for cleansing and maintenance of parts produced in a factory including a burring step after pressing, enhancement of the cleansing effect is expected.

In production of semiconductor elements, if the T-UFB-containing liquid is used as polishing water for a wafer, enhancement of the polishing effect is expected. Additionally, if the T-UFB-containing liquid is used in a resist removal step, prompting of peeling of resist that is not peeled off easily is enhanced.

With the T-UFB generating unit is provided to machines for cleansing and decontaminating medical machines such as a medical robot, a dental treatment unit, an organ preservation container, and the like, enhancement of the cleansing effect and the decontamination effect of the machines is expected. The T-UFB generating unit is also applicable to treatment of animals.

(C) Pharmaceutical Application

If the T-UFB-containing liquid is contained in cosmetics and the like, permeation into subcutaneous cells is prompted, and additives that give bad effects to skin such as preservative and surfactant can be reduced greatly. As a result, it is possible to provide safer and more functional cosmetics.

If a high concentration nanobubble preparation containing the T-UFBs is used for contrasts for medical examination apparatuses such as a CT and an MRI, reflected light of X-rays and ultrasonic waves can be efficiently used. This makes it possible to capture a more detailed image that is usable for initial diagnosis of a cancer and the like.

If a high concentration nanobubble water containing the T-UFBs is used for a ultrasonic wave treatment machine called high-intensity focused ultrasound (HIFU), the irradiation power of ultrasonic waves can be reduced, and thus the treatment can be made more non-invasive. Particularly, it is possible to reduce the damage to normal tissues.

It is possible to create a nanobubble preparation by using high concentration nanobubbles containing the T-UFBs as a source, modifying a phospholipid forming a liposome in a negative electric charge region around the air bubble, and applying various medical substances (such as DNA and RNA) through the phospholipid.

If a drug containing high concentration nanobubble water made by the T-UFB generation is transferred into a dental canal for regenerative treatment of pulp and dentine, the drug enters deeply a dentinal tubule by the permeation effect of the nanobubble water, and the decontamination effect is prompted. This makes it possible to treat the infected root canal of the pulp safely in a short time.

<<Extending Lifetime of Heater>>

As described above, it is possible to generate the UFBs by driving the heating element 10 (hereinafter, referred to as a heater) to generate the film boiling in the liquid. As described with reference to FIGS. 6A and 6B, the extremely large impact is applied to the heater 10 due to the disappearance of the generated film boiling bubble 13. In addition to the impact, the temperature of the heater and the like during the disappearance of the film boiling bubble 13 also causes slow destruction of the heater 10 and the peripheral of the heater 10, and the heater 10 is disconnected eventually.

It was confirmed in the experiment conducted by the inventors that the heater 10 was not disconnected and it was able to generate the UFBs by stably generating the film boiling if the number of times of generating the film boiling is around 100,000 times. In order to generate the UFBs in a short time, there may be the case where it is required to continuously generate the film boiling by using a lot of, or 10,000 pieces or more of for example, the heaters 10. The lifetime of the heaters needs to be extended to produce the UFB generating apparatus 1 at low cost.

In this embodiment, in addition to the heater 10 for UFB generation, another piece of heater (hereinafter, referred to as a shifting heater) for shifting the disappearance position in which the film boiling bubble 13 (air bubble) generated by the heater 10 disappears is provided to the element substrate 12. With the shifting heater driven in the timing in which the film boiling bubble 13 generated by the heater 10 for UFB generation disappears, it is possible to shift the position of the disappearance of the film boiling bubble 13 generated by the heater 10 for UFB generation. This allows the film boiling bubble 13 generated in the heater 10 for UFB generation to suppress the repetitive disappearance in the same position on the heater 10. In other words, the continuous concentration of the impacts from the disappearance of the film boiling bubbles 13 to one point on the heater 10 can be prevented. Consequently, it is possible to extend the lifetime of the heater. Specific description is given below.

Figure 12A:
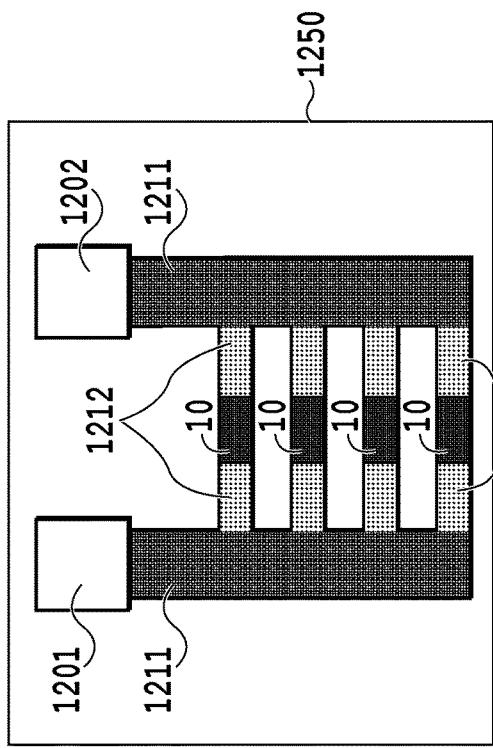
FIGS. 12A to 12D are diagrams for describing a layout of an element substrate.

FIGS. 12A to 12D are diagrams for describing an example of a plane layout of an extracted partial element region 1250 of the element substrate 12 and illustrate an example in which multiple heaters 10 are arranged on one element region 1250. FIG. 12A is an example in which four heaters 10 are arranged in one element region 1250. In FIG. 12A, electrode pads 1201 and 1202 are arranged in the element region 1250 for applying electric energy to each of the four heaters 10. Regions 1212 are individual wiring regions connected to the heaters 10 respectively. Regions 1211 are common wiring regions connecting the multiple individual wiring regions with each of the electrode pads 1201 and 1202. With the voltage pulse illustrated in FIG. 6A applied to the electrode pads 1201 and 1202, currents flow through the common wiring regions 1211, the individual wiring regions 1212, and the heaters 10. Then, the film boiling is generated in the liquid above each heater 10, and the UFBs are generated. Unless otherwise stated, the heaters 10 generating the UFBs to be used have substantially the same shapes and have substantially the same resistance value in the initial state in the following description. The shapes of the heaters 10 may not necessarily be the same shape, and the shapes of the heaters 10 may be different for each element region 1250, for example. Partial changing of the shapes of the heaters 10 can be performed as necessary by mask designing in a step of photolithography. It should be paid attention to that the description is given using the element region 1250 with the small number of the heaters as an example herein for the sake of simple description.

Figure 12B:
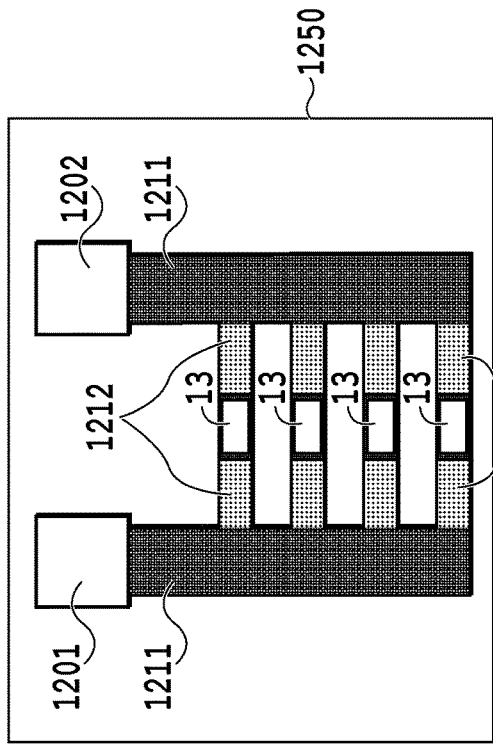
Figure 12C:
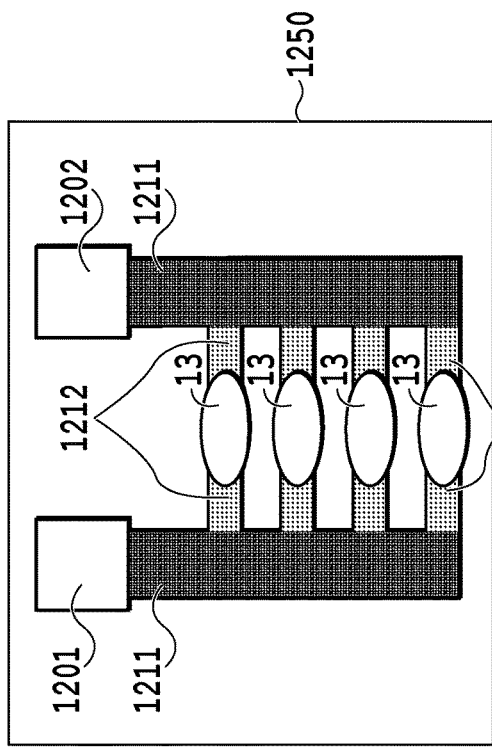
Figure 12D:
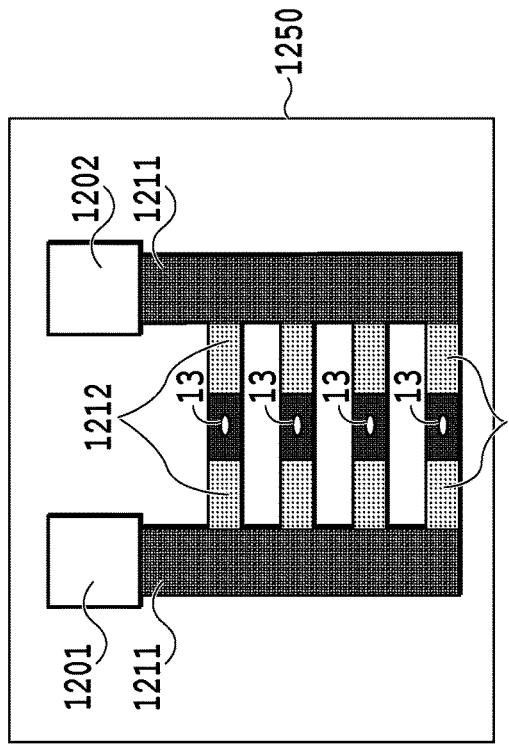

FIG. 12A illustrates the state where no current flows through the heater 10, and no film boiling bubble is generated. FIG. 12B illustrates the situation where the voltage pulse is applied to the electrode pads 1201 and 1202, and the film boiling bubble 13 is generated. FIG. 12B corresponds to the "timing 1" in FIGS. 6A and 6B. FIG. 12C is a diagram illustrating the situation where the film boiling bubble 13 is expanded subsequently from the state in FIG. 12B, and the volume of the film boiling bubble 13 becomes the maximum. FIG. 12C corresponds to the "timing 2" in FIGS. 6A and 6B. FIG. 12D is a diagram illustrating the situation where the shrinkage of the film boiling bubble 13 proceeds from the state in FIG. 12C, and the film boiling bubble 13 disappears in an extremely small region on the heater 10. FIG. 12D corresponds to the "timing 3" in FIGS. 6A and 6B. As illustrated in FIG. 6A, an impact greater than the power at the starting of the film boiling is generated in the disappearance position in this situation. Thus, in the timing in which the film boiling bubble 13 is generated, the film boiling bubble 13 is generated using substantially the entire area of the heater 10 and, on the other hand, in the disappearance, the film boiling bubble 13 disappears in the extremely small region of the heater 10. This causes the impact to be concentrated to one point on each heater 10 in the disappearance of the film boiling bubble 13.

Figure 13A:
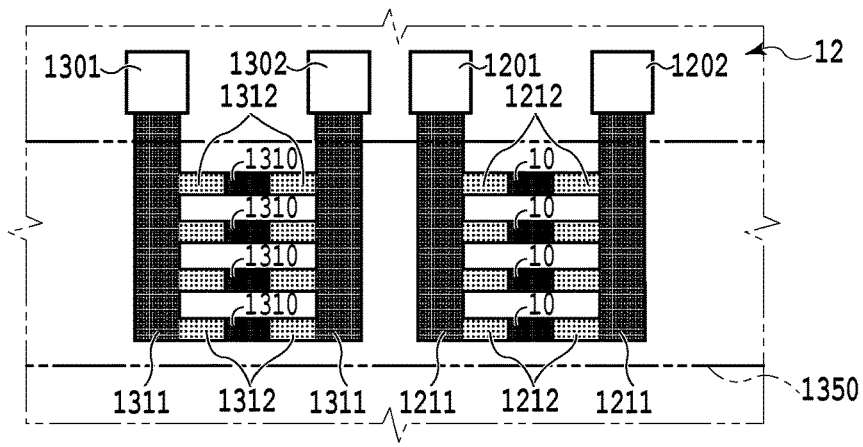
FIGS. 13A to 13D are diagrams for describing a layout of the element substrate.

FIGS. 13A to 13D are diagrams of an example provided with a shifting heater 1310 for shifting the disappearance position of the film boiling bubble 13 generated by each heater 10. FIG. 13A is a diagram of the state where the heater 10 for UFB generation is not generating the film boiling bubble. In FIG. 13A, the shifting heater 1310 is arranged nearby the heater 10 for UFB generation. Hereinafter, the heater 10 for UFB generation is referred to as a UFB generating heater 10 for the sake of convenience in describing. In this embodiment, the shifting heater 1310 is also the heating element generating the film boiling bubble. Although the UFB generating heater and the shifting heater are distinguished from each other in the description for the sake of convenience in describing, they can be implemented as the same heating element. That is, it can be also said that there are provided a first heater group connected to first electrode pads 1201 and 1202 and a second heater group connected to second electrode pads 1301 and 1302 in FIG. 13A. Both the first heater group and the second heater group can be implemented as the heaters capable of generating the UFBs. As described later, the first heater group and the second heater group have different timings of generating the film boiling.

In the example in FIG. 13A, one shifting heater 1310 is arranged for each UFB generating heater 10. However, multiple shifting heaters 1310 may be arranged for each UFB generating heater 10, or one shifting heater 1310 may be arranged for multiple UFB generating heater 10. Although the description is given with the UFB generating heater 10 and the shifting heater 1310 corresponding to each other, the correspondence between them may not be made clearly. Hereinafter, the case where the disappearance position of the film boiling bubble 13 generated by the UFB generating heater 10 is shifted by driving the shifting heater 1310 is described.

Figure 13B:
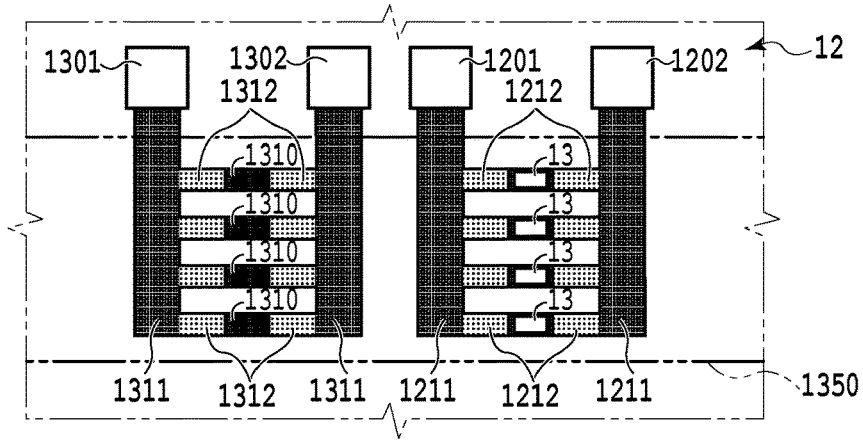
Figure 13C:
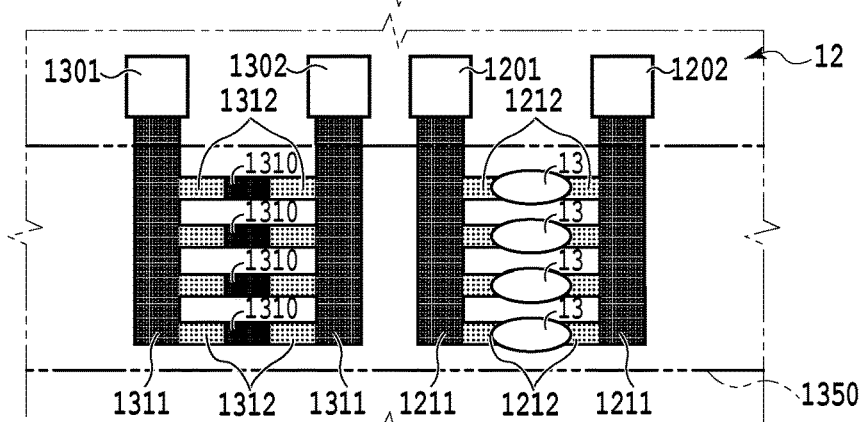

Similar to FIG. 12B, FIG. 13B is a diagram illustrating the situation where the film boiling bubble 13 is generated on the UFB generating heater 10 by the UFB generating heater 10. No film boiling is generated on the shifting heater 1310. Similar to FIG. 12C, FIG. 13C is a diagram illustrating the situation where the film boiling bubble 13 on each UFB generating heater 10 is expanded subsequently, and the volume of the film boiling bubble 13 becomes the maximum. No film boiling is generated on the shifting heater 1310 at this stage as well.

Figure 13D:
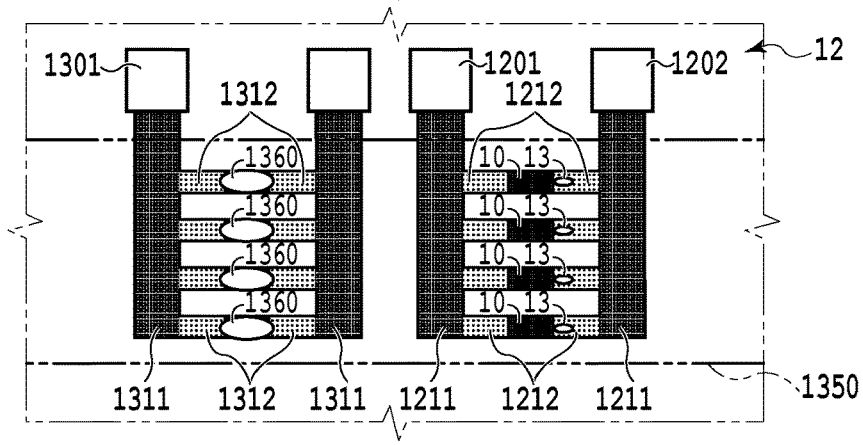

FIG. 13D is a diagram in the same timing as that in FIG. 12D and is a diagram of the timing in which the film boiling bubble 13 generated by the UFB generating heater 10 disappears. There is illustrated the situation where a film boiling bubble 1360 is generated on the shifting heater 1310, and the disappearance position of the film boiling bubble 13 generated by the UFB generating heater 10 is shifted due to a flow of the liquid caused by the generation of the film boiling bubble 1360. As illustrated in FIG. 13D, since the film boiling bubble 13 disappears in the position shifted from the position of the UFB generating heater 10, it is possible to suppress the concentration of the impacts generated from the disappearance to the UFB generating heater 10. Consequently, it is possible to extend the lifetime of each UFB generating heater.

Figure 14A:
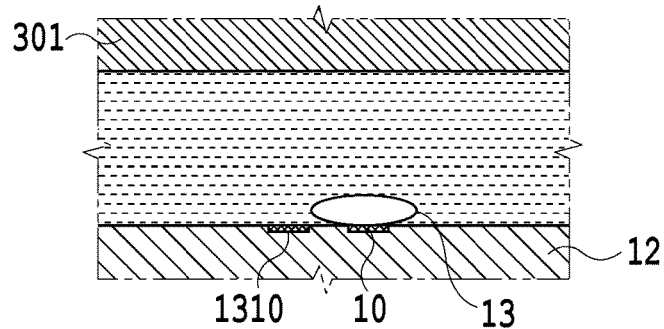
FIGS. 14A to 14D are diagrams of a cross section and a diagram for describing driving timings.
Figure 14B:
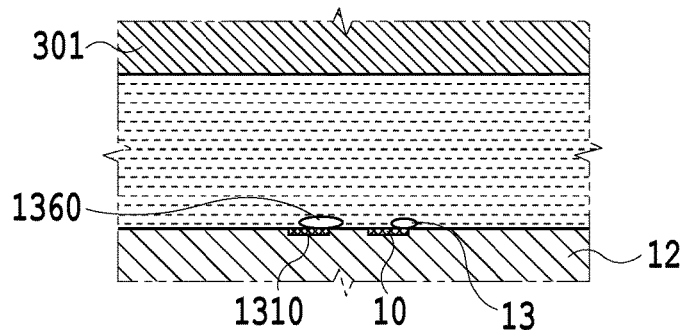
Figure 14C:
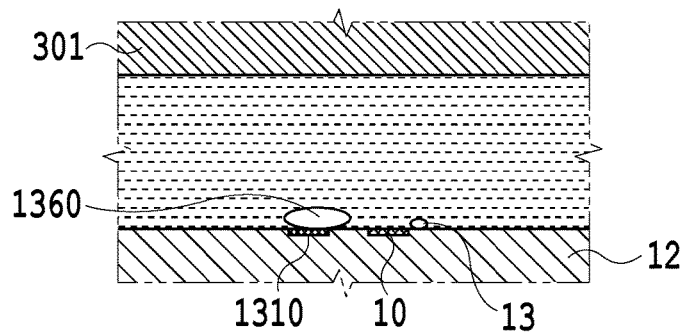
Figure 14D:
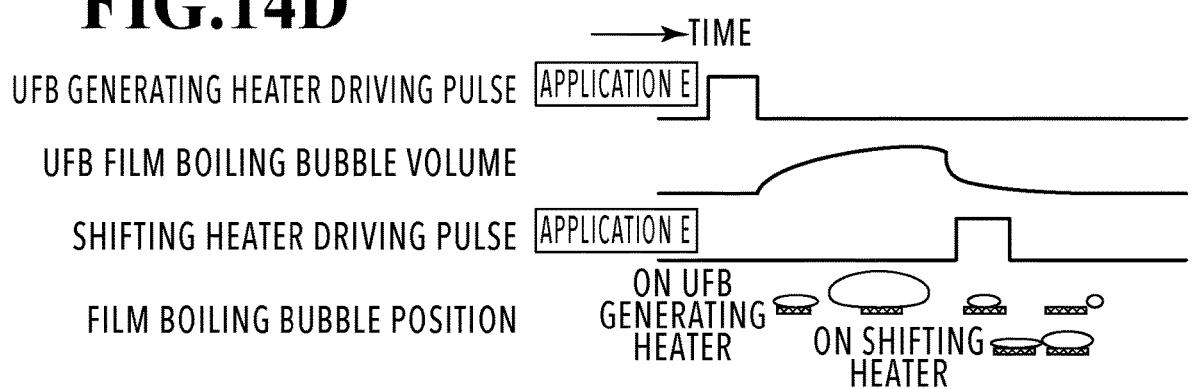

FIGS. 14A to 14D are cross-sectional views of the situations illustrated in FIGS. 13A to 13D and a diagram for describing driving timings. FIG. 14A illustrates the situation where the volume of the film boiling bubble 13 on the UFB generating heater 10 becomes the maximum as illustrated in FIG. 13C. FIG. 14D is a diagram illustrating a driving pulse of the UFB generating heater 10, the size of the volume of the film boiling bubble generated by the UFB generating heater 10, a driving pulse of the shifting heater 1310, and the position of the film boiling bubble on each of the heaters. The chronology is from the left to the right in FIG. 14D. Once the driving pulse is applied to the UFB generating heater 10, the film boiling bubble is generated on the UFB generating heater 10 and is expanded.

FIG. 14B illustrates the situation where the driving pulse is applied to the shifting heater 1310 and the film boiling bubble 1360 is generated on the shifting heater 1310 while the film boiling bubble 13 is started to shrink on the UFB generating heater 10. FIG. 14C is a diagram corresponding to FIG. 13D and illustrates the situation where the disappearance position of the film boiling bubble 13 generated by the UFB generating heater 10 is shifted from the top of the UFB generating heater 10 due to the film boiling bubble 1360 generated on the shifting heater 1310. As described above, the driving of the shifting heater 1310 is started from the timing in which the size of the film boiling bubble 13 on the UFB generating heater 10 becomes substantially the maximum. Then, as the film boiling bubble 1360 generated by the shifting heater 1310 grows, the film boiling bubble 13 on the UFB generating heater 10 starts moving accordingly. Thereafter, in the timing of the disappearance of the film boiling bubble 13, the film boiling bubble 13 moves to a position displaced from the top of the UFB generating heater 10. Although it is preferred to drive the shifting heater after the timing in which the volume of the film boiling bubble 13 becomes the maximum to efficiently move the disappearance position of the film boiling bubble 13 as described above, the embodiment is not limited thereto. For example, the shifting heater may be driven before the volume of the film boiling bubble 13 becomes the maximum.

Figure 15:
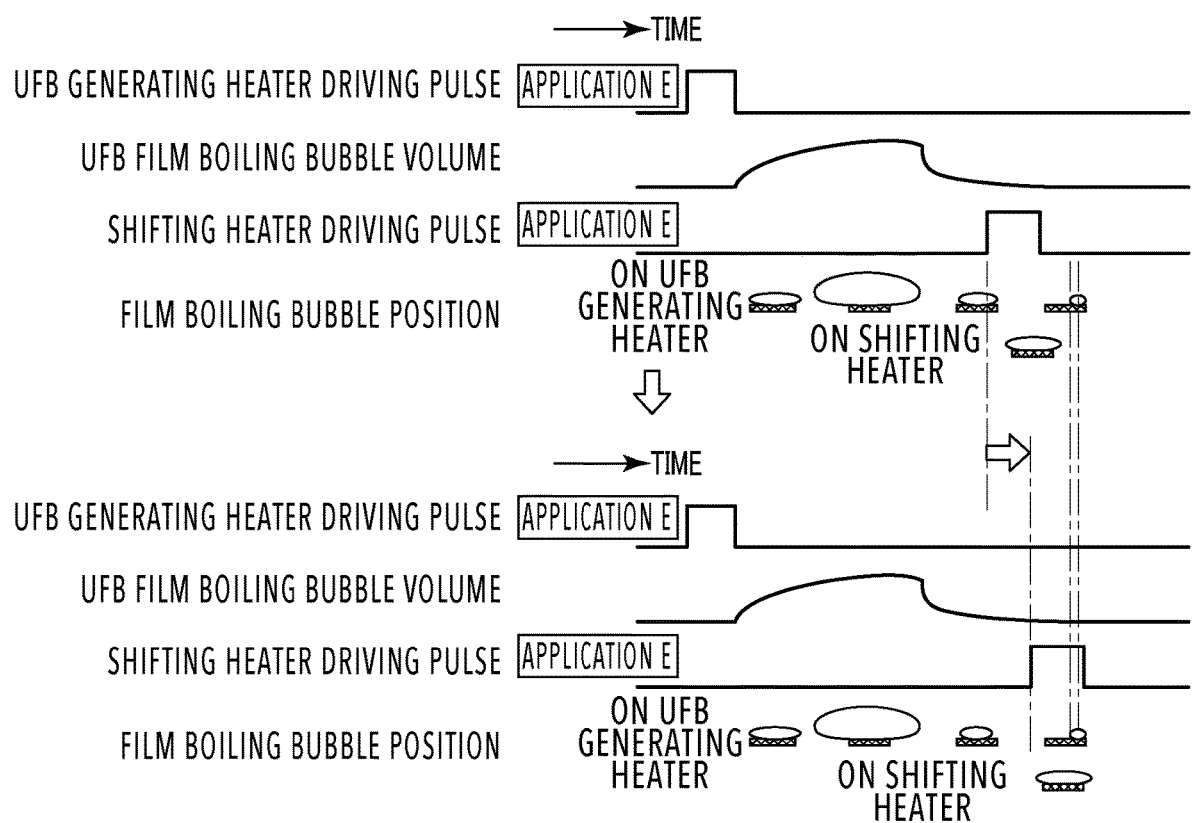
FIG. 15 is a diagram illustrating an example of changing the driving timing of a shifting heater.

FIG. 15 is a diagram illustrating an example of changing the driving timing of the shifting heater. As illustrated in FIG. 14C, the disappearance of the film boiling bubble 13 in the position displaced from the top of the UFB generating heater 10 can suppress the impact on the UFB generating heater 10. However, there is also a possibility that the film boiling bubble 13 disappears in a position not displaced from the UFB generating heater 10, or on the surface of the heater. To deal with this, the timing of driving the shifting heater 1310 is changed at predetermined intervals as illustrated in FIG. 15. For example, as a first driving pattern, the shifting heater 1310 is driven in a first timing after driving the UFB generating heater 10. As a second diving pattern, the shifting heater 1310 is driven in a second timing that is earlier or later than the first timing after driving the UFB generating heater 10. The switching between the first driving pattern and the second driving pattern may be performed every driving of the heater, every predetermined number of times of the driving, or randomly. There may be three or more different driving patterns. The regular or irregular change of the driving timing of the shifting heater 1310 makes it possible to distribute the disappearance positions of the film boiling bubbles 13 generated by the UFB generating heater 10. In other words, the concentration of the disappearance positions to one point on the UFB generating heater 10 can be suppressed. Consequently, it is possible to extend the lifetime of the UFB generating heater 10.

As described in FIG. 1, the UFB generating apparatus 1 is configured to be able to generate a highly concentrated UFB-containing liquid by circulating the liquid. That is, the flow itself of the liquid is being generated in the T-UFB generating unit 300. However, the length of the timing from the generation to the disappearance of the film boiling bubble is considerably short, and accordingly the disappearance positions are concentrated to one point on the UFB generating heater 10 even if the flow of the liquid is being generated for circulating the liquid. With the film boiling bubble 1360 generated by using the shifting heater 1310 to shift the disappearance position of the film boiling bubble 13, it is possible to suppress the concentration of the impact of the disappearance to one point on the UFB generating heater 10.

The flow of the liquid caused by the film boiling bubble 1360 generated by the shifting heater 1310 becomes a flow concentrically spreading from the shifting heater 1310. For this reason, the UFB generating heater 10 is not necessarily associated with the shifting heater 1310 one by one as illustrated in FIGS. 13A to 13D. The arrangement may be made without considering the circulation flow of the liquid in the UFB generating apparatus 1. As described above, the UFB generating heater 10 and the shifting heater 1310 may be the same kind of heaters. Specifically, it is possible to generate the UFBs by using any one of the heaters, and it is also possible to shift the disappearance position of the film boiling bubble generated by another heater.

Figure 16A:
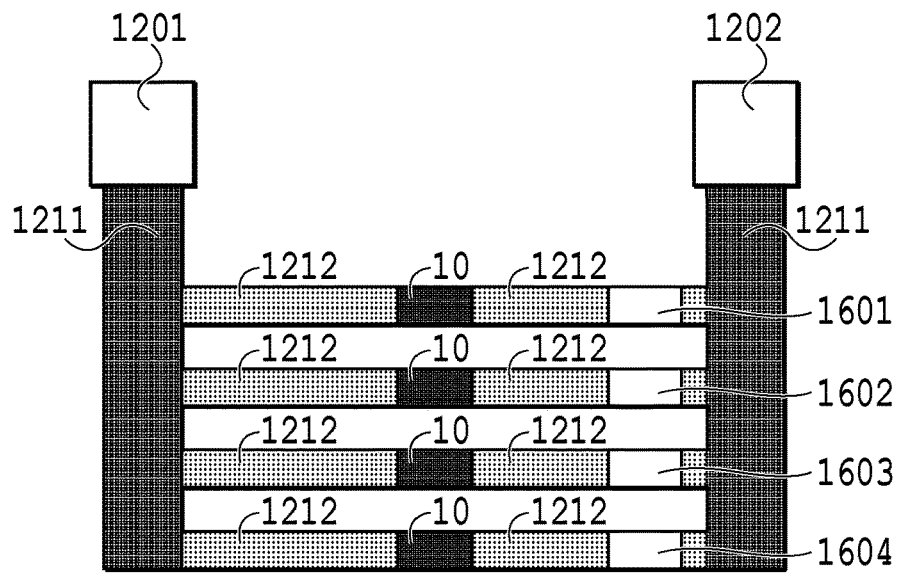
FIGS. 16A to 16C are diagrams for describing a layout of the element substrate and driving timings.
Figure 16B:
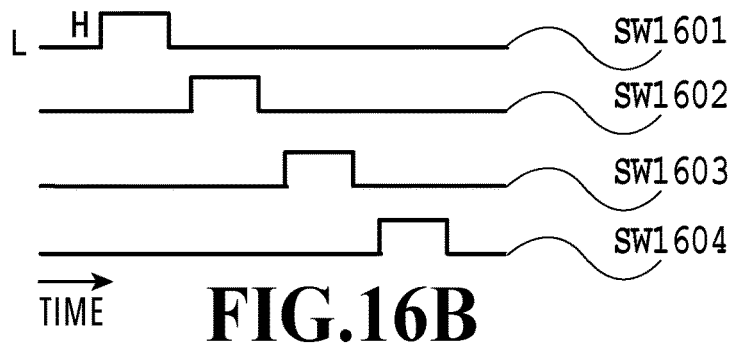
Figure 16C:
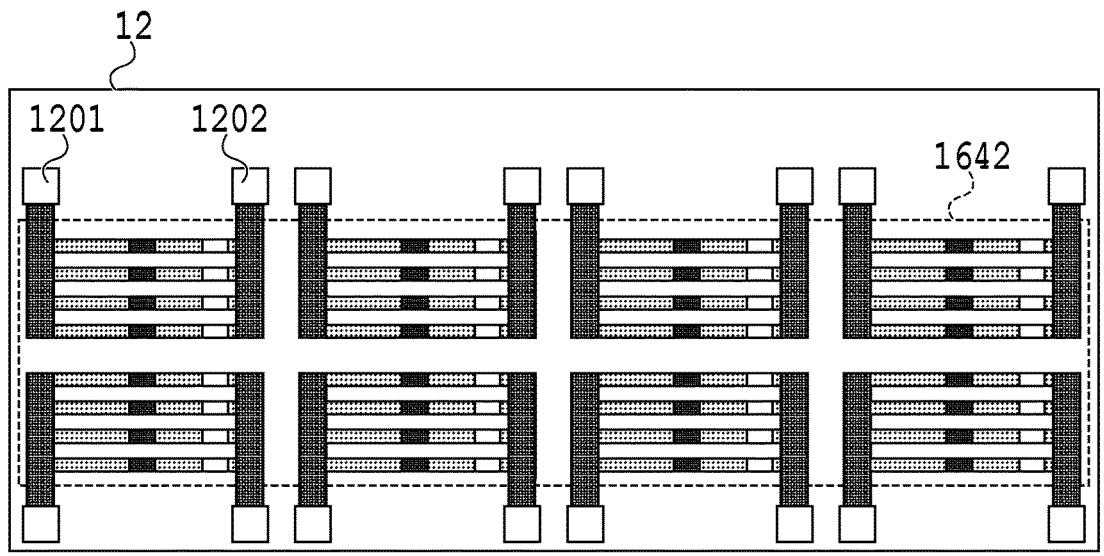

FIGS. 16A to 16C are diagrams illustrating a modification of the element region 1250 illustrated in FIG. 12A. In FIG. 16A, switches (SW) 1601 to 1604 for switching the heaters 10 to which the energy is applied are arranged respectively on the individual wiring regions 1212 connecting the heaters 10. The heater 10 in FIG. 16A is a heater generating the UFBs and is a heater shifting the disappearance position of the film boiling bubble generated on another heater. In the configuration illustrated in FIG. 16A, although a supply voltage (24V) of the heater is applied constantly to the electrode pads 1201 and 1202, no currents flow to the heaters 10 while the SWs are turned off (L). FIG. 16B is a diagram illustrating waveforms of logic signals of the SWs 1601 to 1604 driving the heaters. With logic signals H applied to each of the SWs 1601 to 1604, the SWs are turned on, currents generated by the supply voltage start to flow to the corresponding heaters through the electrode pads 1201 and 1202, and the film boiling occurs on each heater. Thus, the driving of the heaters in a time division manner makes it possible to shift the disappearance positions of the film boiling bubbles on near heaters as illustrated in FIGS. 16A and 16B. The driving in the time division manner may be performed regularly as illustrated in FIG. 14D or may be performed irregularly as illustrated in FIG. 15. As described above, it is also possible to shift the disappearance position of the film boiling bubble by performing the control in the time division manner using the SWs.

FIG. 16C is a diagram illustrating an example where multiple element regions illustrated in FIG. 16A are arranged on the element substrate 12. It is required to arrange a lot of the heating elements to stably generate the UFBs in a short time. Although FIG. 16C illustrates an embodiment where eight element regions each provided with the four heating elements are arranged for the sake of description, it is still possible to arrange a lot of the heating elements by increasing the number of the heating elements in each element region or increasing the number of the element region. In the T-UFB generating unit 300, walls 1642 and a lid (not illustrated) are provided to cover the heaters 10 but not to cover the electrode pads 1201 and 1202 on the element substrate 12 to form the liquid chamber. Although no walls for partitioning the inside of the liquid chamber are provided in this embodiment, it is possible to provide the walls for partitioning the inside. In the case of providing the walls for partitioning the inside, it is preferred to arrange at least two heaters in the inside partitioned by the walls to shift the disappearance position. Additionally, in the case of providing the walls, a preferable wall is a wall that can propagate efficiently a pressure caused by the driving of the shifting heater to the position of an adjacent UFB generating heater and can change the disappearance position of the film boiling bubble caused by the UFB generating heater.

FIGS. 17A to 17D are diagrams illustrating another embodiment for changing the disappearance positions. FIGS. 12A to 12D to FIGS. 16A to 16C describe the embodiment where the electrode pads 1201 and 1202 are formed on the same surface of the substrate on which the heaters 10 are formed. In this case, there is a region (liquid chamber) in contact with the liquid for generating the UFBs provided on the surface on which the heaters 10 are formed. The liquid chamber is covered with walls and a lid. Meanwhile, the electrode pads 1201 and 1202 are arranged outside the liquid chamber. If the heaters 10 and the electrode pads 1201 and 1202 are electrically separated from each other like this case, the routing of the wiring is long. FIGS. 17A and 17B illustrate the embodiment where the electrode pads 1201 and 1202 are not provided on the same surface on which the heaters are provided, and through-holes penetrating to the other surface of the element substrate are formed to provide the electrode pads and a wiring layer on the back surface of the element substrate. FIG. 17B is a cross-sectional view taken along the XVIIb-XVIIb line in FIG. 17A.

As illustrated in FIGS. 17A and 17B, a wiring layer 1741 is formed on a large portion of the back surface of the element substrate. Since there is no effect of heat stress from the haters 10 on the back surface of the element substrate, the large portion of the back surface of the element substrate is used as the wiring layer 1741. Through-holes 1742 connect the wiring layer on the surface on which the heaters are formed and the wiring layer 1741 on the back surface. In this embodiment, an electrode pad 1751 is formed on the large portion (same as the area of the wiring layer 1741 in the example in FIG. 17B) on the back surface. FIG. 17C is a diagram illustrating an example of the element substrate 12 on which multiple pieces of the elements illustrated in FIG. 17A are arranged. In the element substrate 12 in FIG. 17C, since the electrode pads are not formed on the same surface on which the heaters are formed, walls 1761 are formed to reach an outer peripheral portion of the element substrate 12. Although FIG. 17C is a simple illustration for the sake of description, it is still possible to generate the UFBs at high speed by increasing the number of the heaters and the number of the elements.

FIG. 17D is a diagram illustrating an example where the elements illustrated in FIG. 17A are arranged on the entirety of a wafer 1771. Although the element substrate 12 is cut into a rectangular shape in the above-described embodiment, there is no limitation on the shape of the element substrate 12 for generating the UFBs. Thus, as illustrated in FIG. 17D, it is possible to apply the whole wafer 1771 to the T-UFB generating unit 300 without cutting out the substrate on which the heaters and the wirings are formed.

As described with reference to FIGS. 17A to 17D, in the case of performing the back surface wiring of the element substrate 12 to arrange the electrode pads on the back surface, the electrode pads can be separated easily from the liquid. In the case of providing the electrode pads on the back surface of the element substrate 12, a driver, a switch, and the like outputting the supply voltage pulse are implemented by external devices. For example, the stable generation of the UFBs can be made by driving those drivers and the like connected with the wafer 1771 in FIG. 17D. In this case, for example, the lifetime of the heaters 10 can be extended by changing the driving timings of adjacent heaters 10 from each other.

As describe above, this embodiment includes a second heater that moves the disappearance position of the film boiling bubble generated on the first heater for UFB generation. With the second heater driven in a predetermined timing, it is possible to move the disappearance position of the film boiling bubble generated on the first heater. Additionally, with the driving timing of the second heater changed randomly or regularly, it is possible to avoid fixing the position of the disappearance of the film boiling bubble generated by the first heater, and thus it is possible to extend the lifetime of the heaters.

In the example in FIG. 17D, the heaters in the heater groups driven in different timings from each other may be arranged alternately. The heaters in each of the three or more heater groups driven in three or more different timings may be arranged in the same order or in the different order. Each heater in the first heater group may be arranged in any position as long as the arrangement can make the shifting of the disappearance position of the film boiling bubble generated on a heater in the other heater group by the driving in the different timing. Thus, the heaters in the first heater group may be arranged adjacent to each other as long as the positional relation between the heaters in the first heater group and the heaters in the other heater group can make the shifting of the disappearance positions by the heaters in the other heater group. On the wafer 1771 or the element substrate 12, the order of the heater groups may be different depending on predetermined regions. Additionally, the intervals between the heaters may either be regular intervals or not.

In the above-described embodiments, the example where the first heater and the second heater can be applied as the same kind of heaters is described. That is, both the first heater and the second heater can be used as the heater generating the UFBs. However, the embodiments are not limited to this example, and the first heater and the second heater may be formed as different kinds of heaters. For example, heaters with different durability can be used.

The interval between the first heater (UFB generating heater) and the adjacent second heater (shifting heater) can be set appropriately depending on the sizes of the heaters, the shape of the liquid chamber, presence of the walls, and the like. The interval may be set to any as long as the pressure of the bubble generated by driving the second heater is propagated efficiently to the film boiling bubble generated by the first heater to change the disappearance position of this film boiling bubble. Thus, the second heater is not necessarily the heater closest to the first heater among the multiple heaters. For example, another first heater and another second heater may be arranged between the first heater and the second heater.

According to this disclosure, it is possible to efficiently generate the UFB-containing liquid and to provide a UFB generating apparatus with improved durability and an ultrafine bubble generating method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-035838, filed Feb. 28, 2019, which is hereby incorporated by reference wherein in its entirety.

What is claimed is:

1. An ultrafine bubble generating apparatus that generates ultrafine bubbles by generating film boiling by causing a heater provided in a liquid to generate heat, the ultrafine bubble generating apparatus comprising:
   an element substrate including a first heater that generates the film boiling in the liquid and a second heater that is arranged adjacent to the first heater,
   wherein the first heater and the second heater are driven in different timings, and
   wherein the second heater is driven in a timing from a time point at which a size of a film boiling bubble generated by the film boiling on the first heater becomes a maximum until the film boiling bubble disappears.

2. The ultrafine bubble generating apparatus according to claim 1, wherein on the element substrate, a first heater group including a plurality of first heaters that are driven in a first timing and a second heater group including a plurality of second heaters that are driven in a second timing are arranged.

3. The ultrafine bubble generating apparatus according to claim 2, wherein an interval from the first timing to the second timing is changed regularly or irregularly.

4. The ultrafine bubble generating apparatus according to claim 2, wherein a voltage pulse for driving the first heaters in the first heater group is applied in the first timing, and a voltage pulse for driving the second heaters in the second heater group is applied in the second timing.

5. The ultrafine bubble generating apparatus according to claim 2, wherein the first heaters in the first heater group are connected to a same first electrode pad that supplies energy for driving the first heaters, and
   wherein the second heaters in the second heater group are connected to a second electrode pad different from the first electrode pad.

6. The ultrafine bubble generating apparatus according to claim 5, wherein the first and second electrode pads are arranged on a back surface of the element substrate.

7. The ultrafine bubble generating apparatus according to claim 2, wherein the first and second heater groups respectively including the first heaters and the second heaters are connected to a same electrode pad that supplies energy for driving the first and second heaters in the first and second heater groups, and
   wherein switches that switch the first and second heaters to which the energy is applied are arranged between the electrode pad and the first and second heaters.

8. The ultrafine bubble generating apparatus according to claim 2, wherein in a liquid chamber in which the first heater group and the second heater group are in contact with the liquid, no walls partitioning the liquid chamber are formed between the first heaters in the first heater group and the second heaters in the second heater group.

9. An ultrafine bubble generating method for generating ultrafine bubbles by generating film boiling by causing a heater provided in a liquid to generate heat, comprising:
   driving a first heater that generates the film boiling in the liquid in a first timing; and
   driving a second heater that is arranged adjacent to the first heater in a second timing different from the first timing,
   wherein the second heater is driven in a timing from a time point at which a size of a film boiling bubble generated by the film boiling on the first heater becomes a maximum until the film boiling bubble disappears.

* * * * *